US012776707B2

(12) United States Patent

Pedroso et al.

(10) Patent No.: US 12,776,707 B2
(45) Date of Patent: Oct. 27, 2026

(54) N-LEVEL QSW FCML BUCK CONVERTER

(71) Applicant: Hamilton Sundstrand Corporation, Charlotte, NC (US)

(72) Inventors: Douglas Araujo Pedroso, São Borja RS (BR); Ignacio Castro Álvarez, Gijón (ES)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 189 days.

(21) Appl. No.: 18/753,450

(22) Filed: Jun. 25, 2024

(65) Prior Publication Data

US 2025/0015718 A1 Jan. 9, 2025

(30) Foreign Application Priority Data

Jul. 6, 2023 (EP) .................................... 23183994

(51) Int. Cl.

*H02M 3/07* (2006.01)
*H02M 1/00* (2006.01)
*H02M 3/158* (2006.01)

(52) U.S. Cl.

CPC ......... *H02M 3/158* (2013.01); *H02M 1/0058* (2021.05); *H02M 1/0095* (2021.05); *H02M 3/07* (2013.01)

(58) Field of Classification Search

CPC ............................................... H02M 3/07–078

See application file for complete search history.

(56) References Cited

U.S. PATENT DOCUMENTS

| | | | | |
|---|---|---|---|---|
| 6,178,099 | B1 | 1/2001 | Schutten et al. | |
| 9,571,006 | B2 * | 2/2017 | Stahl ................. | H02M 7/53871 |
| 10,381,921 | B1 | 8/2019 | Haryani et al. | |
| 10,944,321 | B2 | 3/2021 | Chuang et al. | |
| 11,101,734 | B2 | 8/2021 | Lin et al. | |
| 12,506,406 | B1 * | 12/2025 | Fang ....................... | H02J 1/102 |
| 2015/0249403 | A1 * | 9/2015 | Sato .................... | H02M 7/4837 363/127 |
| 2020/0350817 | A1 * | 11/2020 | De ....................... | H02M 3/155 |

(Continued)

FOREIGN PATENT DOCUMENTS

| | | | |
|---|---|---|---|
| CN | 113949294 | A | 1/2022 |
| WO | 2015149866 | A1 | 10/2015 |

OTHER PUBLICATIONS

Blackwell, et al. "Dynamic Level Selection for Full Range ZVS in Flying Capacitor Multi-Level Converters" IEEE 19th Workshop on Control and Modeling for Power Electronics, Jun. 25, 2018, pp. 1-8.

(Continued)

*Primary Examiner* — Sisay G Tiku
(74) *Attorney, Agent, or Firm* — CANTOR COLBURN LLP

(57) ABSTRACT

An n-level flying capacitor multi-level buck converter, for converting a DC input voltage into a DC output voltage provided at a load. The n-level flying capacitor multi-level buck converter is configured to: operate a first and second pairs of switching elements in a sequence to selectively apply a portion of the input voltage across the output filter; and operate the first and second pairs of switching elements such that each switching element turns on when a voltage across the switching element is zero.

16 Claims, 14 Drawing Sheets

(56) References Cited

U.S. PATENT DOCUMENTS

| | | | | |
|---|---|---|---|---|
| 2023/0216407 | A1* | 7/2023 | Abdelhamid ......... | H02M 3/071 323/263 |
| 2025/0119066 | A1* | 4/2025 | Yoscovich ............ | H02M 1/126 |

OTHER PUBLICATIONS

European Search Report for Application No. 23183994.5, mailed Dec. 13, 2023, 10 pages.

Fang, "A Method of reconfiguring Flying Capacitor Multilevel Input Stage for Wide Input Voltage Range Converter Design", IEEE Transactions on Power Electronics, vol. 37, No. 2, Feb. 2022, pp. 1905-1925.

Abstract of CN113949294 (A), Published: Jan. 18, 2022, 1 page.

Dimarino, et al. "High-Temperature Silicon Carbide: Characterization of State-of-the-Art Silicon Carbide Power Transistors" IEEE Industrial Electronics Magazine ( vol. 9, Issue: 3, Sep. 2015), pp. 19-30 Sep. 17, 2015.

Han, et al. "Comprehensive Efficiency, Weight, and Volume Comparison of SiC- and Si-Based Bidirectional DC-DC Converters for Hybrid Electric Vehicles", IEEE Transactions on Vehicular Technology, vol. 63, No. 7, Sep. 2014, pp. 3001-3010.

Hua, et al. "Soft-Switching Techniques in PWM Converters" IEEE Transactions on Industrial Electronics, vol. 42, No. 6, Dec. 1995, pp. 595-603.

Liu, et al. LCL Filter Design of a 50-kW 60-kHz SiC Inverter with Size and Thermal Considerationsfor Aerospace Applications, IEEE Transactions on Industrial Electronics, vol. 64, No. 10, Oct. 2017, pp. 8321-8333.

Martin, et al. "A very simple analog control for QSW-ZVS source/sink buck converter with seamless mode transition", 2018 IEEE 19th Workshop on Control and Modeling for Power Electronics (COMPEL), Jun. 25-28, 2018, 6 pages.

Vazquez, et al. "Variable-Width Hysteretic Analog Control for QSW-ZVS and TCM Source/Sink Converters" IEEE Transactions on Power Electronics, vol. 35, No. 3, Mar. 2020, pp. 3195-3207.

Vorperian, "Quasi-Square-Wave Converters: Topologies and Analysis" IEEE Transactions on Power Electronics, vol. 3, No. 2, Apr. 1988, pp. 183-191.

Chou Derek et al: "A Zero-Voltage Switching, Physically Flexible Multilevel GaN DC-DC Converter", 2017 IEEE Energy Conversion Congress and Exposition (ECCE), IEEE, Oct. 1, 2017, pp. 3433-3439.

European Office Action for Application No. 23183994.5, mailed Jan. 22, 2026, 9 pages.

* cited by examiner

N-LEVEL QSW FCML BUCK CONVERTER

CROSS-REFERENCE TO RELATED APPLICATIONS

This application claims the benefit of European Patent Application No. 23183994.5 filed Jul. 6, 2023, the disclosure of which is incorporated herein by reference in its entirety.

TECHNICAL FIELD

This disclosure relates to flying capacitor multi-level (FCML) DC to DC voltage converters.

BACKGROUND

In various DC to DC voltage conversion applications, there are often large variations in either the input or output voltage. Various topologies of existing DC to DC voltage converters require a high degree of complexity of control of the circuit and/or have complex input EMI filtering requirements in order to accommodate these variations.

In various DC to DC voltage conversion applications, it may also be advantageous to reduce the voltage stresses across components. This may allow smaller components to be used in many applications. This may also lead to a prolonged lifetime of circuit components.

Other aims in many DC to DC voltage conversion applications include reducing losses, to reducing cooling requirements of the circuit. Reducing losses over certain components may result in a reduced cooling requirement for those components and/or it may result in prolonging the lifetime of those components.

In many DC to DC voltage applications, reducing the weight of the DC to DC voltage converter may also be of benefit.

SUMMARY

When viewed from a first aspect, the present disclosure provides an n-level flying capacitor multi-level buck converter, for converting a DC input voltage into a DC output voltage provided at a load, comprising: an output filter comprising: an inductor arranged in series with an output capacitor and for arranging in series with the load; and the output capacitor arranged in series with the inductor and for arranging in parallel with the load; wherein the n-level flying capacitor multi-level buck converter comprises: a first pair of switching elements arranged in series with the DC input voltage; and a second pair of switching elements arranged in series with the DC input voltage; wherein each of the first and second pairs of switching elements comprises a first switching element and a second switching element; wherein the first switching element and the second switching element of the first pair of switching elements are arranged adjacent each other; wherein the first switching element of the second pair of switching elements is arranged adjacent to the first switching element of the first pair of switching elements; wherein the second switching element of the second pair of switching elements is arranged adjacent to the second switching element of the first pair of switching elements; and wherein the output filter is arranged in series with the first switching elements of the first and second pairs of switching elements, and in parallel with the second switching elements of the first and second pairs of switching elements; wherein the n-level flying capacitor multi-level buck converter further comprises a first flying capacitor in parallel with the first pair of switching elements; and wherein the n-level flying capacitor multi-level buck converter is configured to: operate the first and second pairs of switching elements in a sequence to selectively apply a portion of the input voltage across the output filter; and operate the first and second pairs of switching elements such that each switching element is switched on when a voltage across the switching element is zero.

In some examples, the switching elements comprise a switch, a diode and a (e.g. parasitic) capacitance in parallel.

In various examples, any switching elements using actively controlled power semiconductor technology, such as metal-oxide-semiconductor field-effect transistors (MOSFETs), may be used. In various examples, instead of MOSFETs any of insulated-gate bipolar transistors (IGBTs), high-electron-mobility transistors (HEMTs) or bidirectional switches are used as alternatives, or in combination with MOSFETs.

In some examples, the n-level flying capacitor multi-level buck converter further comprises a third pair of switching elements: wherein the third pair of switching elements is arranged in series with the DC input voltage; wherein the third pair of switching elements comprises a first switching element and a second switching element; wherein the first switching element of the third pair of switching elements is arranged adjacent to the first switching element of the second pair of switching elements; wherein the second switching element of the third pair of switching elements is arranged adjacent to the second switching element of the second pair of switching elements; wherein the output filter is arranged in series with the first switching element of the third pair of switching elements, and in parallel with the second switching element of the third pair of switching elements; and wherein the n-level flying capacitor multi-level buck converter further comprises a second flying capacitor in parallel with the second pair of switching elements; and wherein the n-level flying capacitor multi-level buck converter is configured to: operate the third pair of switching elements in a sequence to selectively apply a portion of the input voltage across the output filter; and operate the third pairs of switching elements such that each switching element is switched on when a voltage across the switching element is zero.

In some examples, the first switching element of each pair of switching elements is arranged to be switched off before the second switching element of each pair of switching elements is switched on; and the second switching element of each pair of switching elements is arranged to be switched off before the first switching element of each pair of switching elements is switched on.

In some examples, the n-level flying capacitor multi-level buck converter is arranged such that the current through the inductor is zero when the second switching element of each pair of switching elements is switched off.

In some examples, the n-level flying capacitor multi-level buck converter is arranged such that the current through the inductor is less than zero when the second switching element of each pair of switching elements is switched off.

In some examples, the n-level flying capacitor multi-level buck converter is arranged such that the current through the inductor is a predetermined value when the second switching element of each pair of switching elements is switched off.

In some examples, each pair of switching elements are arranged to operate out of phase with each other. Out of phase may be defined as operating asynchronously, i.e. not switching simultaneously.

In some examples, the pairs of switching elements are arranged to be triggered by a series of phase shifted pulses: wherein a phase shift of the phase shifted pulses corresponds to a number of active levels of the n-level flying capacitor multi-level buck converter; and wherein a pulse width of the phase shifted pulses corresponds to a duty cycle of the n-level flying capacitor multi-level buck converter.

In some examples, the n-level flying capacitor multi-level buck converter is configured to operate the pairs of switching elements to change a or the number of active levels of the n-level flying capacitor multi-level buck converter.

In some examples, the n-level flying capacitor multi-level buck converter is configured to reduce the number of active levels by switching on both the first switching element and the second switching element of the pair of switching elements arranged proximate to the DC input voltage.

In some examples, the n-level flying capacitor multi-level buck converter further comprises a third pair of switching elements: wherein the third pair of switching elements are arranged in series with the DC input voltage; wherein the third pair of switching elements comprises a first switching element and a second switching element; wherein the first switching element of the third pair of switching elements is arranged adjacent to the first switching element of the second pair of switching elements; wherein the second switching element of the third pair of switching elements is arranged adjacent to the second switching element of the second pair of switching elements; wherein the output filter is arranged in series with the first switching element of the third pair of switching elements, and in parallel with the second switching element of the third pair of switching elements; and wherein the n-level flying capacitor multi-level buck converter further comprises a flying capacitor in parallel with the second pair of switching elements; and wherein the n-level flying capacitor multi-level buck converter is configured to further reduce the number of active levels by switching on both the first switching element and the second switching element of the pair of switching elements adjacent to the pair of switching elements which are arranged proximate to the DC input voltage.

In some examples, the n-level flying capacitor multi-level buck converter is configured to change the number of active levels depending on at least one of the input voltage, the output voltage or the ratio between the input voltage and the output voltage.

In some examples, the n-level flying capacitor multi-level buck converter further comprises a controller arranged to generate a or the series of phase shifted pulses to trigger the pairs of switching elements of the n-level flying capacitor multi-level buck converter: wherein a or the phase shift of the phase shifted pulses corresponds to a or the number of active levels of the n-level flying capacitor multi-level buck converter; and wherein a or the pulse width of the phase shifted pulses corresponds to a or the duty cycle of the n-level flying capacitor multi-level buck converter.

In some examples, the controller further comprises a current feedback loop which adjusts a switching frequency of the switching elements based on a current through the inductor.

In some examples, the controller further comprises a voltage feedback loop which adjusts the duty cycle based on the at least one of the input voltage, the output voltage or the ratio between the input voltage and the output voltage.

When viewed from a second aspect, the present disclosure provides a method of operating an n-level flying capacitor multi-level buck converter, for converting a DC input voltage into a DC output voltage provided at a load, wherein the n-level flying capacitor multi-level buck converter comprises: an output filter comprising: an inductor arranged in series with an output capacitor and for arranging in series with the load; and the output capacitor arranged in series with the inductor and for arranging in parallel with the load; wherein the n-level flying capacitor multi-level buck converter comprises: a first pair of switching elements arranged in series with the DC input voltage; and a second pair of switching elements arranged in series with the DC input voltage; wherein each of the first and second pairs of switching elements comprises a first switching element and a second switching element; wherein the first switching element and the second switching element of the first pair of switching elements are arranged adjacent; wherein the first switching element of the second pair of switching elements is arranged adjacent to the first switching element of the first pair of switching elements; wherein the second switching element of the second pair of switching elements is arranged adjacent to the second switching element of the first pair of switching elements; and wherein the output filter is arranged in series with the first switching elements of the first and second pairs of switching elements, and in parallel with the second switching elements of the first and second pairs of switching elements; wherein the n-level flying capacitor multi-level buck converter further comprises a flying capacitor in parallel with the first pair of switching elements; wherein the method comprises: operating the first and second pairs of switching elements in a sequence to selectively apply a portion of the input voltage across the output filter; and operating the first and second pairs of switching elements such that each switching element is switched on when a voltage across the switching element is zero.

In some examples, the n-level flying capacitor multi-level buck converter further comprises a third pair of switching elements: wherein the third pair of switching elements is arranged in series with the DC input voltage; wherein the third pair of switching elements comprises a first switching element and a second switching element; wherein the first switching element of the third pair of switching elements is arranged adjacent to the first switching element of the second pair of switching elements; wherein the second switching element of the third pair of switching elements is arranged adjacent to the second switching element of the second pair of switching elements; wherein the output filter is arranged in series with the first switching element of the third pair of switching elements, and in parallel with the second switching element of the third pair of switching elements; and wherein the n-level flying capacitor multi-level buck converter further comprises a second flying capacitor in parallel with the second pair of switching elements; and the method further comprises: operating the third pair of switching elements in a sequence to selectively apply a portion of the input voltage across the output filter; and operating the third pairs of switching elements such that each switching element is switched on when a voltage across the switching element is zero.

n some examples, the method further comprises operating the first and second pairs of switching elements such that the first switching element of each pair of switching elements is switched off before the second switching element of each pair of switching elements is switched on; and the second switching element of each pair of switching elements is switched off before the first switching element of each pair of switching elements is switched on.

In some examples, the method further comprises operating each pair of switching elements such that the current through the inductor is zero when the second switching element of each pair of switching elements is switched off.

In some examples, the method further comprises operating each pair of switching elements such that the current through the inductor is less than zero when the second switching element of each pair of switching elements is switched off.

In some examples, the method further comprises operating each pair of switching elements such that the current through the inductor is a predetermined value when the second switching element of each pair of switching elements is switched off.

In some examples, the method further comprises operating each pair of switching elements out of phase with each other.

In some examples, the method further comprises triggering the pairs of switching elements with a series of phase shifted pulses: wherein a phase shift of the phase shifted pulses corresponds to a number of active levels of the n-level flying capacitor multi-level buck converter; and wherein a pulse width of the phase shifted pulses corresponds to a duty cycle of the n-level flying capacitor multi-level buck converter.

In some examples, the method further comprises operating the pairs of switching elements to change a or the number of active levels of the n-level flying capacitor multi-level buck converter.

In some examples, the method further comprises reducing the number of active levels by switching on both the first switching element and the second switching element of the pair of switching elements arranged proximate to the DC input voltage.

In some examples, the n-level flying capacitor multi-level buck converter further comprises a third pair of switching elements: wherein the third pair of switching elements is arranged in series with the DC input voltage; wherein the third pair of switching elements comprises a first switching element and a second switching element; wherein the first switching element of the third pair of switching elements is arranged adjacent to the first switching element of the second pair of switching elements; wherein the second switching element of the third pair of switching elements is arranged adjacent to the second switching element of the second pair of switching elements; wherein the output filter is arranged in series with the first switching element of the third pair of switching elements, and in parallel with the second switching element of the third pair of switching elements; and wherein the n-level flying capacitor multi-level buck converter further comprises a second flying capacitor in parallel with the second pair of switching elements; and the method further comprises further reducing the number of active levels by switching on both the first switching element and the second switching element of the pair of switching elements adjacent to the pair of switching elements which are arranged proximate to the DC input voltage.

In some examples, the method further comprises changing the number of active levels depending on at least one of the input voltage, the output voltage or the ratio between the input voltage and the output voltage.

In some examples, the n-level flying capacitor multi-level buck converter further comprises a controller; and the method further comprises generating a or the series of phase shifted pulses to trigger the pairs of switching elements of the n-level flying capacitor multi-level buck converter: wherein a or the phase shift of the phase shifted pulses corresponds to a or the number of active levels of the n-level flying capacitor multi-level buck converter; and wherein a or the pulse width of the phase shifted pulses corresponds to a or the duty cycle of the n-level flying capacitor multi-level buck converter.

In some examples, the controller further comprises a current feedback loop; and the method further comprises adjusting a switching frequency of the switching elements based on a current through the inductor.

In some examples, the controller further comprises a voltage feedback loop; and the method further comprises adjusting the duty cycle based on the at least one of the input voltage, the output voltage or the ratio between the input voltage and the output voltage.

When viewed from a third aspect, the present disclosure provides an n-level flying capacitor multi-level buck converter, for converting a DC input voltage into a DC output voltage provided at a load, comprising: an output filter comprising: an inductor arranged in series with an output capacitor and for arranging in series with the load; and the output capacitor arranged in series with the inductor and for arranging in parallel with the load; wherein the n-level flying capacitor multi-level buck converter comprises: a first pair of switching elements arranged in series with the DC input voltage; and a second pair of switching elements arranged in series with the DC input voltage; wherein each of the first and second pairs of switching elements comprises a first switching element and a second switching element; wherein the first switching element and the second switching element of the first pair of switching elements are arranged adjacent each other; wherein the first switching element of the second pair of switching elements is arranged adjacent to the first switching element of the first pair of switching elements; wherein the second switching element of the second pair of switching elements is arranged adjacent to the second switching element of the first pair of switching elements; and wherein the output filter is arranged in series with the first switching elements of the first and second pairs of switching elements, and in parallel with the second switching elements of the first and second pairs of switching elements; wherein the n-level flying capacitor multi-level buck converter further comprises a first flying capacitor in parallel with the first pair of switching elements; and wherein the n-level flying capacitor multi-level buck converter is configured to operate the pairs of switching elements to change a number of active levels of the n-level flying capacitor multi-level buck converter.

In some examples, the n-level flying capacitor multi-level buck converter is further configured to: operate the first and second pairs of switching elements in a sequence to selectively apply a portion of the input voltage across the output filter; and operate the first and second pairs of switching elements such that each switching element is switched on when a voltage across the switching element is zero.

It will be appreciated that the optional features of the first aspect of the present invention relate equally to this aspect of the disclosure.

When viewed from a fourth aspect, the present disclosure provides a method of operating an n-level flying capacitor multi-level buck converter, for converting a DC input voltage into a DC output voltage provided at a load, wherein the n-level flying capacitor multi-level buck converter comprises: an output filter comprising: an inductor arranged in series with an output capacitor and for arranging in series with the load; and the output capacitor arranged in series with the inductor and for arranging in parallel with the load; wherein the n-level flying capacitor multi-level buck converter comprises: a first pair of switching elements arranged in series with the DC input voltage; and a second pair of switching elements arranged in series with the DC input voltage; wherein each of the first and second pairs of switching elements comprises a first switching element and a second switching element; wherein the first switching element and the second switching element of the first pair of switching elements are arranged adjacent; wherein the first switching element of the second pair of switching elements is arranged adjacent to the first switching element of the first pair of switching elements; wherein the second switching element of the second pair of switching elements is arranged adjacent to the second switching element of the first pair of switching elements; and wherein the output filter is arranged in series with the first switching elements of the first and second pairs of switching elements, and in parallel with the second switching elements of the first and second pairs of switching elements; wherein the n-level flying capacitor multi-level buck converter further comprises a flying capacitor in parallel with the first pair of switching elements; wherein the method comprises operating the pairs of switching elements to change a number of active levels of the n-level flying capacitor multi-level buck converter.

In some examples, the method further comprises: operating the first and second pairs of switching elements in a sequence to selectively apply a portion of the input voltage across the output filter; and operating the first and second pairs of switching elements such that each switching element is switched on when a voltage across the switching element is zero.

It will be appreciated that the optional features of the second aspect of the present invention relate equally to this aspect of the disclosure.

BRIEF DESCRIPTION OF DRAWINGS

One or more non-limiting examples will now be described, by way of example only, and with reference to the accompanying figures in which.

DETAILED DESCRIPTION

Figure 1:
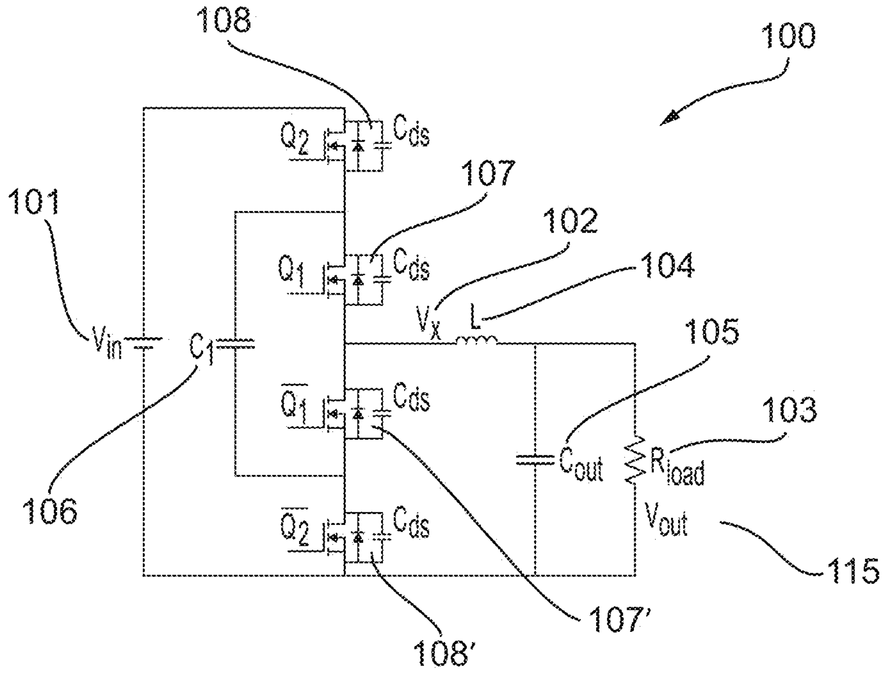
FIG. 1 shows a three-level FCML buck converter.

FIG. 1 shows a three-level FCML buck converter 100.

FIG. 1 shows: an input voltage Vin 101, a flying capacitor C1 106, a square wave voltage Vx 102, a first pair of switching elements Q1 107 and $\overline{Q_1}$ 107', a second pair of switching elements Q2 108 and $\overline{Q_2}$ 108', a load Rload 103 and an output filter comprising an inductor L 104 and an output capacitor Cout 105. An output voltage Vout 115 is applied across the load Rload 103.

Switching elements Q1 107 and $\overline{Q_1}$ 107' operate as a pair, such that at any given time only one of Q1 107 and $\overline{Q_1}$ 107' is turned on, while the other is turned off. Similarly, switching elements Q2 108 and $\overline{Q_2}$ 108' operate as a pair, such that at any given rime only one of Q2 108 and $\overline{Q_2}$ 108' is turned on, while the other is turned off. The first pair of switching elements, Q1 107 and $\overline{Q_1}$ 107', operate out of phase with the second pair of switching elements, Q2 108 and $\overline{Q_2}$ 108'.

There are two modes of operation of the three-level FCML buck converter 100 depending on the duty cycle. In the first mode of operation, the duty cycle is greater than half, i.e. Q1 107 and Q2 108 are each turned on for more than half of the cycle time, and the square wave voltage Vx 102 varies between Vin/2 and Vin 101. In the second mode of operation, the duty cycle is less than half, i.e. Q1 107 and Q2 108 are both turned on for less than half of the cycle time, and the square wave voltage Vx 102 varies between zero and Vin 101.

The first mode of operation of the three-level FCML buck converter 100 will be described with reference to various states of the circuit 100. It should be understood that when Q1 107 is on $\overline{Q_1}$ 107' is off and vice-versa. It should also be understood that when Q2 108 is on $\overline{Q_2}$ 108' is off and vice-versa.

In the first state Q1 107 is on and Q2 108 is on, and therefore Vx 102 is equal to Vin 101. In the second state Q2 108 turns off; hence Q1 107 is on and Q2 108 is off, and therefore Vx 102 is equal to the voltage Vc across the flying capacitor C1 106. In the third state Q2 108 turns back on; hence the third state is equivalent to the first state and Vx 102 is equal to Vin 101. In the fourth state Q1 107 turns off; hence Q1 107 is off and Q2 108 is on, and therefore Vx 102 is equal to Vin 101 minus the voltage Vc across the flying capacitor C1 106. In the final state, Q1 107 turns back on, and the circuit state is equivalent to the first state hence Vx 102 is equal to Vin 101. Typically, the voltage Vc across the flying capacitor C1 106 is equal to Vin/2, and therefore the square wave voltage Vx 102 alternates between Vin 101 and Vin/2.

The second mode of operation of the three-level FCML buck converter 100 will be described with reference to various states of the circuit 100.

In the first state Q1 107 is off and Q2 108 is off, and therefore Vx 102 is equal to zero. In the second state Q2 108 turns on; hence Q1 107 is off and Q2 108 is on, and therefore Vx 102 is equal to Vin 101 minus the voltage Vc across the flying capacitor C1 106. In the third state Q2 108 turns back off; hence the third state is equivalent to the first state and Vx 102 is equal to zero. In the fourth state Q1 107 turns on; hence Q1 107 is on and Q2 108 is off, and therefore Vx 102 is equal to the voltage Vc across the flying capacitor C1 106. In the final state, Q1 107 turns back off, and the circuit state is equivalent to the first state hence Vx 102 is equal to zero. Typically, the voltage Vc across the flying capacitor C1 106 is equal to Vin/2, and therefore the square wave voltage Vx 102 alternates between zero and Vin/2.

The output filter (comprising the inductor L 104 and the output capacitor Cout 105) filters out AC components of the square wave voltage Vx 102. Therefore, a DC output voltage Vout is applied to the load Rload 103. This DC output voltage Vout is the stepped-down input voltage Vin 101. The ratio between Vin 101 and the voltage Vout applied to the load Rload 103 is dependent on the duty cycle.

The three-level FCML buck converter 100 is known as a three-level converter as it is able to operate between three voltage levels: zero, Vin/2 and Vin 101.

When $\overline{Q_1}$ 107' is turned off and Q1 107 is turned on, the voltage $\overline{V_{ds1}}$ across the drain source capacitance Cds of $\overline{Q_1}$ 107' charges towards Vc. Vc is the voltage across the flying capacitor C1 106, which in this example is Vin/2. Hence, in this example, the voltage $\overline{V_{ds1}}$ charges towards Vin/2. At the same time, the voltage Vds1 across the drain source capacitance Cds of Q1 107 discharges to zero.

A mode of operation of the switching elements Q1 107 and $\overline{Q_1}$ 107' enables Q1 107, and $\overline{Q_1}$ 107', to be switched on when the voltage, Vds1 and $\overline{V_{ds1}}$, across the respective drain source capacitance Cds is equal to zero. This is known as zero voltage switching (ZVS), and reduces switching losses over the switching elements, Q1 107 and $\overline{Q_1}$ 107'. The same mode of operation can be applied to enable the second pair of switching elements Q2 108 and $\overline{Q_2}$ 108' to turn on ZVS.

Figure 2:
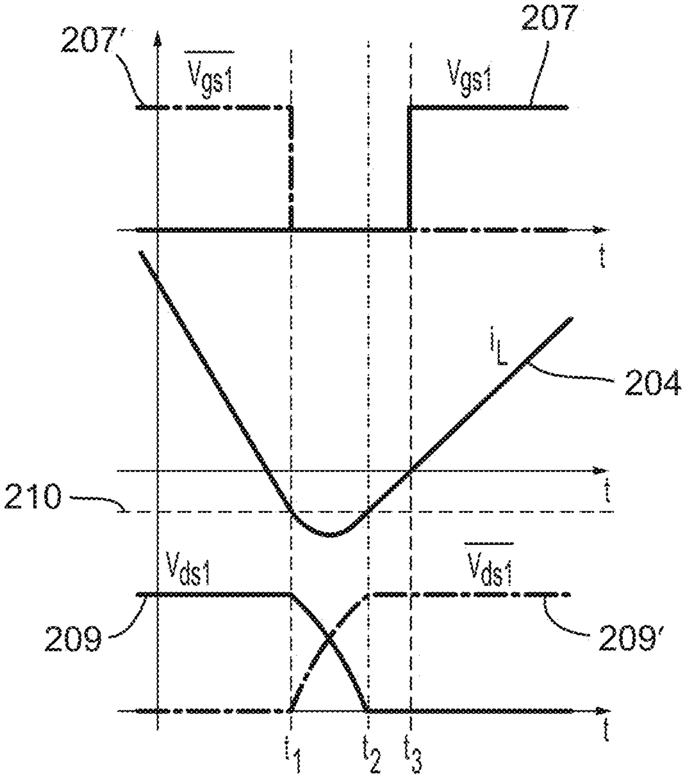
FIG. 2 shows various waveforms during operation of a three-level FCML buck converter during QSW/TCM mode of operation.

FIG. 2 shows various waveforms during operation of the three-level FCML buck converter 100 of FIG. 1 during this ZVS mode of operation. FIG. 2 shows the gate-source voltage Vgs1 207 of Q1 107, the gate-source voltage $\overline{V_{gs1}}$ 207' of $\overline{Q_1}$ 107', the current iL 204 through the inductor L 104, the voltage Vds1 209 across the drain-source capacitance Cds of Q1 107 and the voltage $\overline{V_{ds1}}$ 209' across the drain-source capacitance Cds of $\overline{Q_1}$ 107'. Switching on Q1 107 ZVS may be achieved by allowing the voltage Vds1 209 across the drain source capacitance Cds of Q1 107 to fully discharge, i.e. to reach zero, before switching on Q1 107.

As can be seen in FIG. 2, this may be achieved by switching off $\overline{Q_1}$ 107' at a time t1, which corresponds with the current iL 204 through the inductor L 104 reaching a value of izvs 210. This ZVS current izvs 210 is equal or smaller than zero. Switching off $\overline{Q_1}$ 107' at t1 results in a resonance between the inductor L 104 and drain-source capacitances Cds of Q1 107 and $\overline{Q_1}$ 107'. Consequently, the drain-source capacitances Cds of Q1 107 and $\overline{Q_1}$ 107' will be respectively discharged and charged. At t2, the voltage Vds1 209 across the drain source capacitance Cds of Q1 107 has fully discharged. Therefore, Q1 107 may be switched on ZVS at t3, any time after t2.

This mode of operation is known as quasi-square wave/zero voltage switching (QSW/ZVS). The value of izvs 210 is critical in ZVS operation of each of the pairs switching elements Q1 107 and $\overline{Q_1}$ 107', and Q2 108 and $\overline{Q_2}$ 108'. Typically, the value of izvs 210 will be the same for all transitions, in other words the value of izvs 210 will be the same for the first pair of switching elements Q1 107 and $\overline{Q_1}$ 107' and the second pair of switching elements Q2 108 and $\overline{Q_2}$ 108'. When izvs 210 is less than zero during QSW operation, this is known as quasi-square wave triangular conduction mode zero voltage switching (QSW/TCM/ZVS) operation.

Figure 3A:
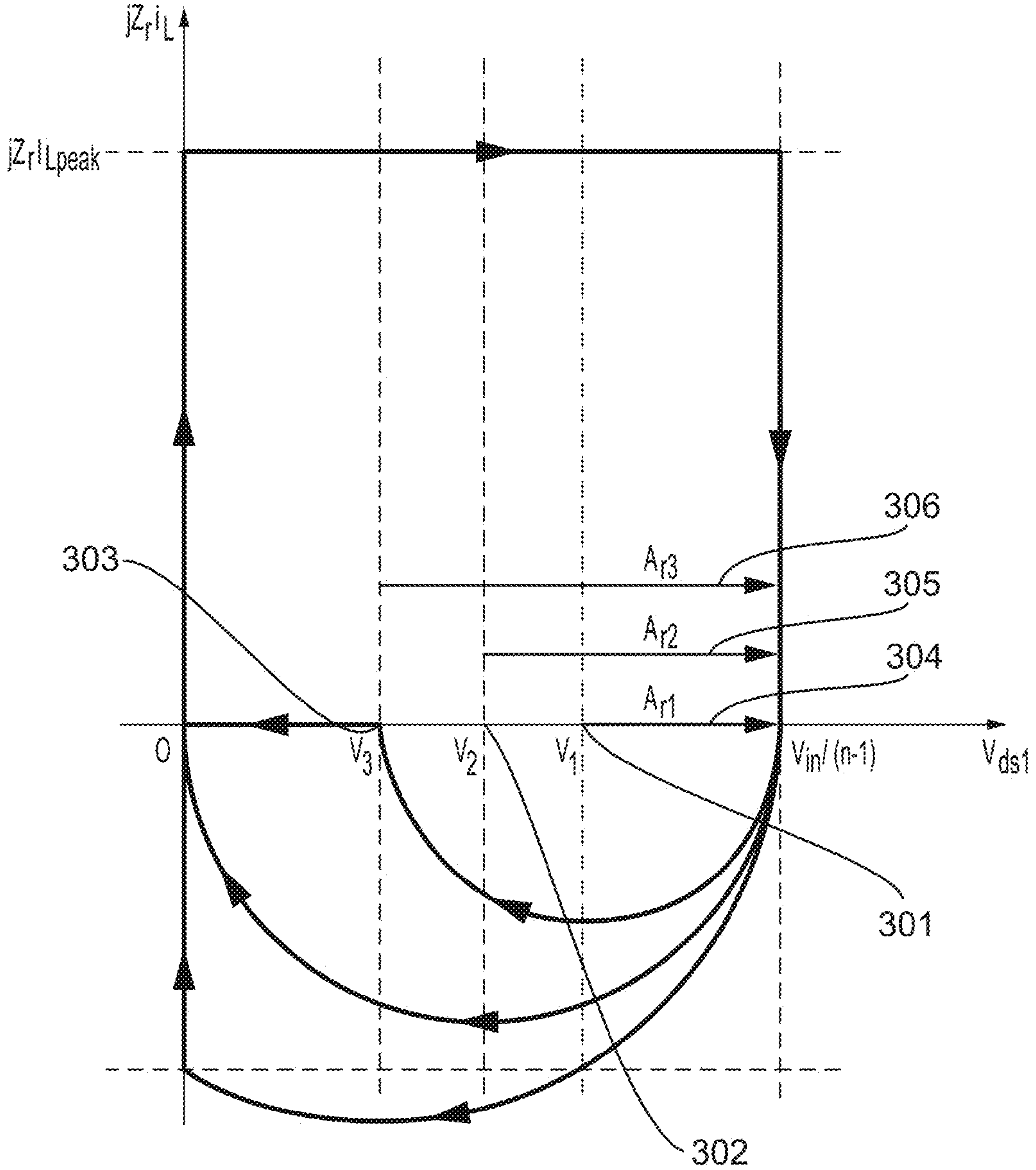
FIG. 3*a* shows a state plane representation of the switching cycle of a three-level FCML buck converter with three different output voltages.

Referring to FIG. 3*a*, a state plane representation of a switching cycle with three different output voltages is shown with izvs 210 equal to zero. The three different desired output voltages are V1 301, V2 302 and V3 303. Each output voltage V1, V2 and V3 are associated with different resonance vectors having different resonant vector lengths, Ar1 304, Ar2 305, and Ar3 306 respectively.

If the desired output voltage is V3 303, the voltage Vds1 209 across the drain source capacitance Cds of Q1 107 reaches zero during the resonance, therefore QSW/ZVS can be achieved.

If the desired output voltage is V2 302, this is the limit case to achieve QSW/ZVS for izvs equal to zero.

However, for a desired output voltage V1 301, the vector length Ar1 is not large enough to ensure ZVS operation. Therefore, Q1 107 cannot turn on ZVS because the voltage Vds1 209 across the drain source capacitance Cds of Q1 107 has not fully discharged when Q1 107 must turn on.

The minimum input-to-output voltage relation required to achieve ZVS in a traditional two-level buck converter using izvs equal to zero can be defined as Vin>2Vout.

The input-to-output voltage relation required to achieve QSW/ZVS in a n-level FCML buck converter using izvs 210 equal to zero can be defined as Vin≥2Vout (n−1). Hence for the three-level FCML buck converter 100 of FIG. 1, the input-to-output voltage relation required between Vin 101 and Vout, the voltage applied across the load Rload 103, is Vin≥4Vout.

Figure 3B:
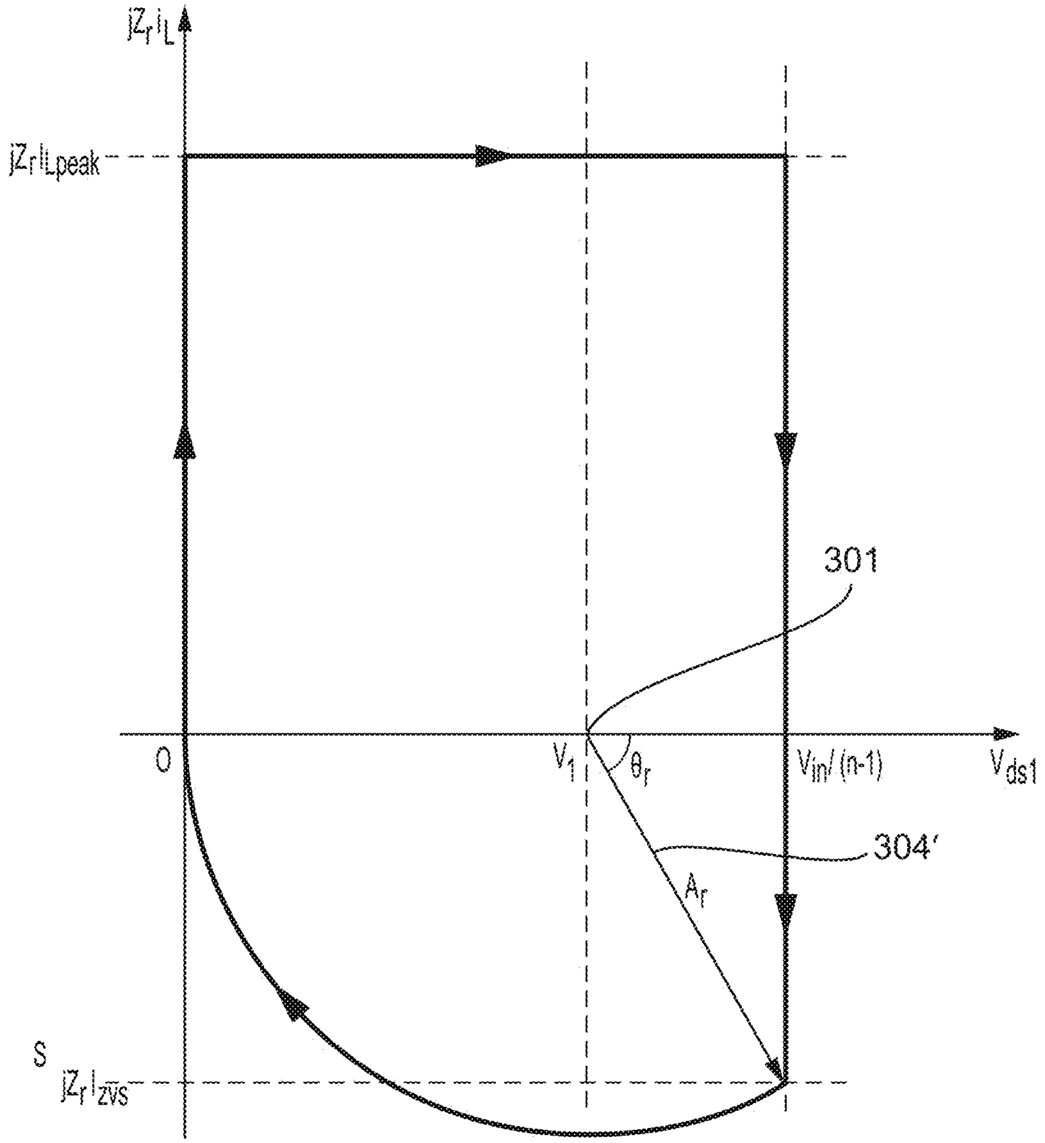
FIG. 3*b* shows a state plane representation of the switching cycle of a three-level FCML buck converter operating in TCM.

However, as noted above, izvs 210 may be set to values smaller than zero to include output voltages larger than V2 302 in the ZVS operation. This concept of having a negative izvs 210 is known as triangular condition mode (TCM) operation. FIG. 3*b* shows that by allowing a certain negative value for izvs 210, the initial conditions of the resonance are changed, therefore increasing the Ar 304' vector length. Therefore, ZVS operation can still be achieved for output voltages larger than V2 302, such as V1 301.

Operation of multi-level FCML buck converters using QSW/ZVS and QSW/TCM/ZVS modes of operation is a novel approach to operation of multi-level FCML buck converters. These operation modes may result in all of the benefits associated with soft switching operation of the switching elements, such as lower switching losses, lower cooling requirements and/or prolonged lifetime of the switching elements.

Figure 4:
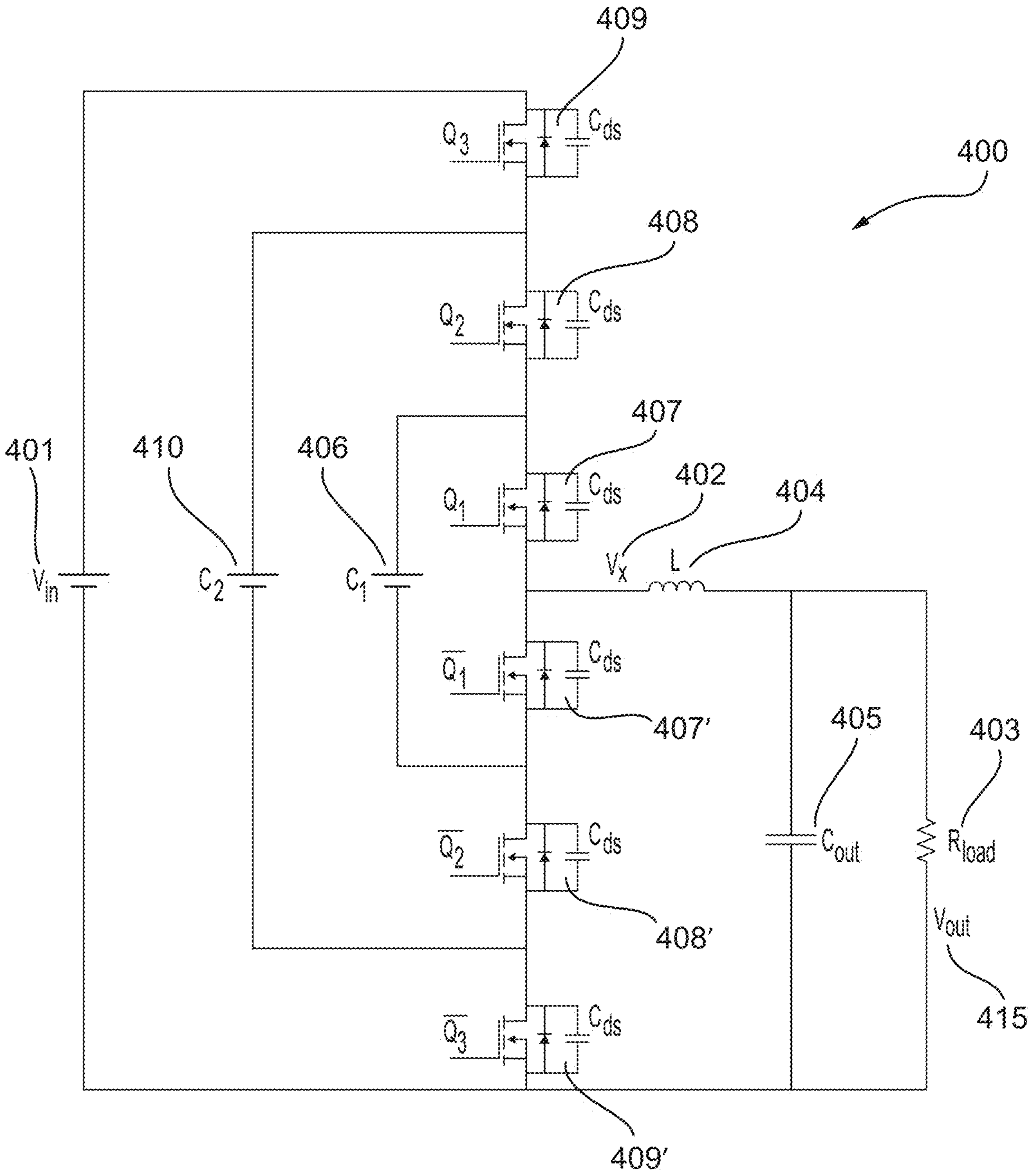
FIG. 4 shows a four-level FCML buck converter.

FIG. 4 shows a four-level FCML buck converter 400. FIG. 4 shows an input voltage Vin 401, a first flying capacitor C1 406, an output filter voltage Vx 402, a first pair of switching elements Q1 107 and $\overline{Q_1}$ 107', a second pair of switching elements Q2 408 and $\overline{Q_2}$ 108', a third pair of switching elements Q3 409 and $\overline{Q_3}$ 409', a second flying capacitor C2 410, a load Rload 403 and an output filter (comprising an inductor L 404 and an output capacitor Cout 405). An output voltage Vout 415 is applied to the load Rload 403.

Typically, the voltage Vc1 across the flying capacitor C1 406 is Vin/3, and the voltage Vc2 across the flying capacitor C2 410 is 2Vin/3. Hence, any of four voltage levels: zero, Vin/3, 2Vin/3 or Vin 401 may be applied to Vx 402. Therefore, this circuit 400 is a four-level converter.

Figure 5:
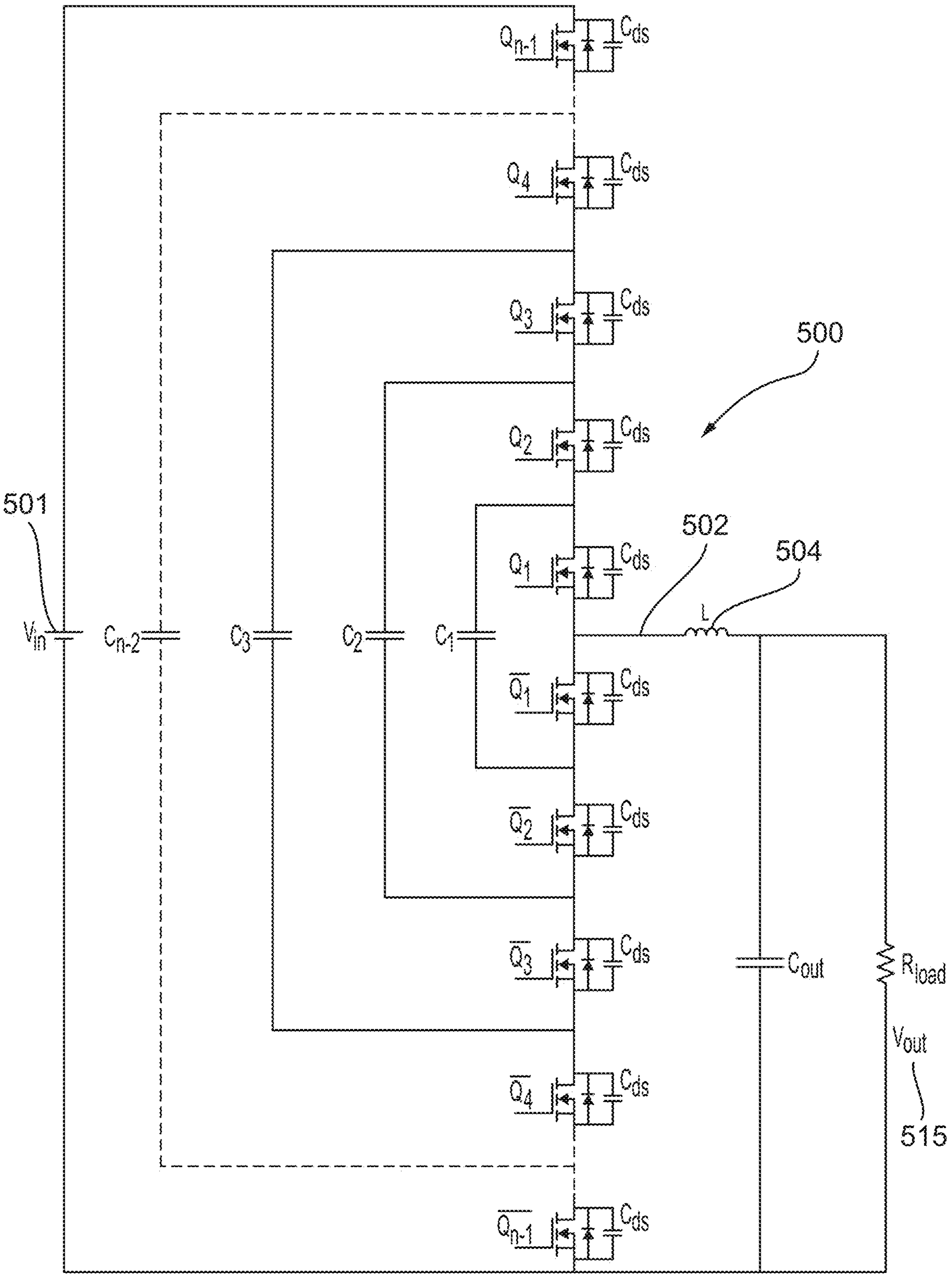
FIG. 5 shows an n-level FCML buck converter.

FIG. 5 shows a n-level flying capacitor multi-level (FCML) buck converter 500. This topology can apply any number of n voltage levels to the output filter voltage Vx 502 between zero and Vin 501.

The general QSW/ZVS voltage condition for the n-level FCML buck converter 500, for $i_{zvs}$ equal to zero, can be defined in terms of duty cycle D and the number of levels n as:

$$0 \leq D < \frac{1}{n-1}$$

Hence, for higher level FCML buck converters, the duty cycle for which QSW/ZVS can be achieved, without operating TCM, reduces. The ratio of output voltage $V_{out}$ to input voltage $V_{in}$ depends on the duty cycle. Therefore, higher level FCML buck converters cannot achieve the same ratio of $V_{out}$ to $V_{in}$ as lower level FCML buck converters unless they operate TCM, i.e. a lower maximum value of $V_{out}$ can be achieved for the same $V_{in}$.

A traditional two-level QSW/ZVS buck converter switching period $$T_{sw}^{2L}$$

can be defined as:

$$T_{sw}^{2L} = 2L_{buck}\left(\frac{P_{out}}{V_{out}} - i_{ZVS_{set}}\right)\frac{V_{in}}{V_{out}(V_{in} - V_{out})}$$

The n-level QSW/ZVS FCML buck converter 500 switching period $$T_{sw}^{nL}$$

can be defined as:

$$T_{sw}^{nL} = 2L_{buck}\left(\frac{P_{out}}{V_{out}} - i_{ZVS_{set}}\right)\left(\frac{1}{v_{on}} - \frac{1}{v_{off}}\right)(n-1)$$

Hence, the switching period $$T_{sw}^{nL}$$

varies with both the number of levels of the n-level FCML buck converter 500 and the ratio between output voltage Vout to input voltage Vin. Therefore, if the ratio of Vout to Vin varies for a given number of levels of the FCML converter, so does the switching period. Note that Lbuck in this equation is the inductance of inductor L 504. Von is the voltage during the magnetization of the inductor (i.e. first switching element is on), Voff is the voltage over the inductor during the demagnetization (i.e. first switching element is off).

Figure 6:
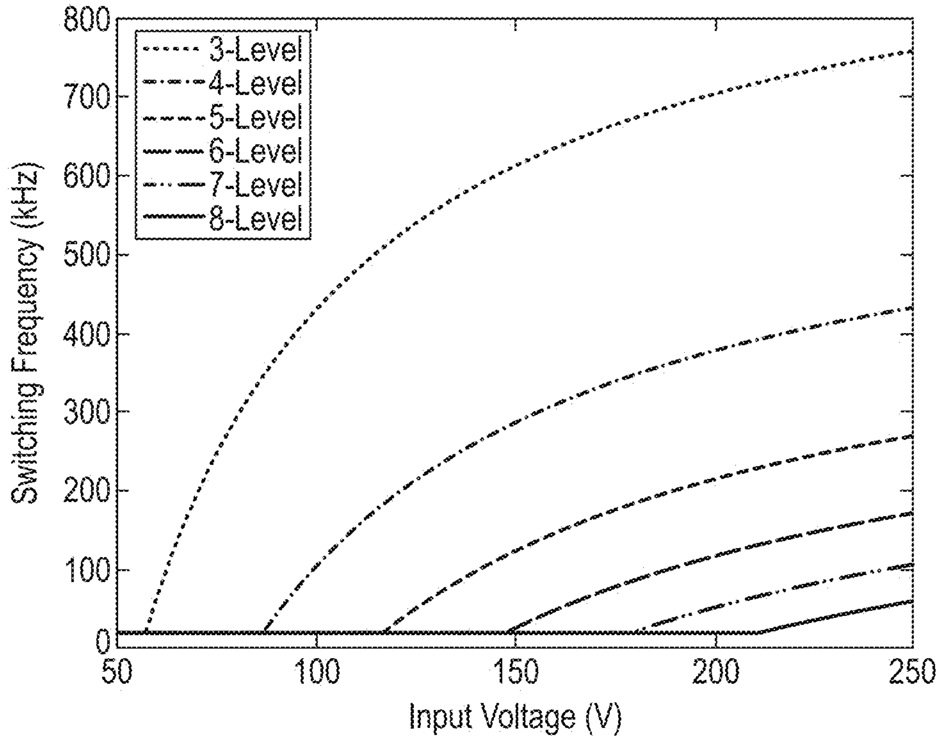
FIG. 6 shows a graph of switching frequency vs input voltage for a given output voltage for several different level FCML buck converters operating QSW.

As can be seen in FIG. 6, the input voltage range of operation is higher in QSW/ZVS, without operating TCM, for lower level FCML buck converters. However, a lower number of FCML converter levels also results in a high variation in switching frequency as the ratio of Vout to Vin varies. This variation in switching frequency is detrimental for design of the input EMI filter to the DC to DC voltage converter.

It can also be seen in FIG. 6 that at a higher number of levels of the FCML buck converter, the QSW/ZVS range of operation significantly reduces. This forces the converter to operate in TCM at low frequencies, i.e. izvs smaller than zero, to achieve ZVS switch on. In theory it may be possible for higher level FCML buck converters to switch on ZVS at low frequencies by operating TCM, with increasingly negative values of izvs. However, in practice increasingly negative values of izvs will result in increasingly higher conduction losses. These conduction losses will eventually negate the benefits of reduced switching losses associated with ZVS operation. The example illustrated in FIG. 6 considers a 400 W converter with a 28 V output voltage, a 500 nH output inductor and a minimum switching frequency of 20 KHz.

Based on the above equation, and analysis of the n-level FCML buck converter 500, for a given desired output voltage Vout it is possible to operate the converter with a different active number of levels depending on the input voltage. This enables variation of the switching frequency to be reduced, while also ensuring QSW/ZVS operation may be achieved over the full range of input voltages without operating TCM, or operating TCM with only a relatively small negative value of izvs to avoid the conduction losses associated with larger negative values of izvs. Reducing the variation of the switching frequency can be particularly beneficial, as variable switching frequency may penalize the overall design, and particularly the EMI filter at the input to the converter (not shown).

The level switcher mode of operation may be defined as switching the number of active levels according to the ratio between the input voltage and desired output voltage of the converter. In some examples, the input voltage and the output voltage may both vary. In some examples, where the desired output voltage is constant and the input voltage varies, the level switcher mode of operation may switch the number of active levels according to the input voltage. In further examples, where only the desired output voltage varies while the input voltage is constant, the level switcher mode of operation may switch the number of active levels according to the output voltage.

Figure 7:
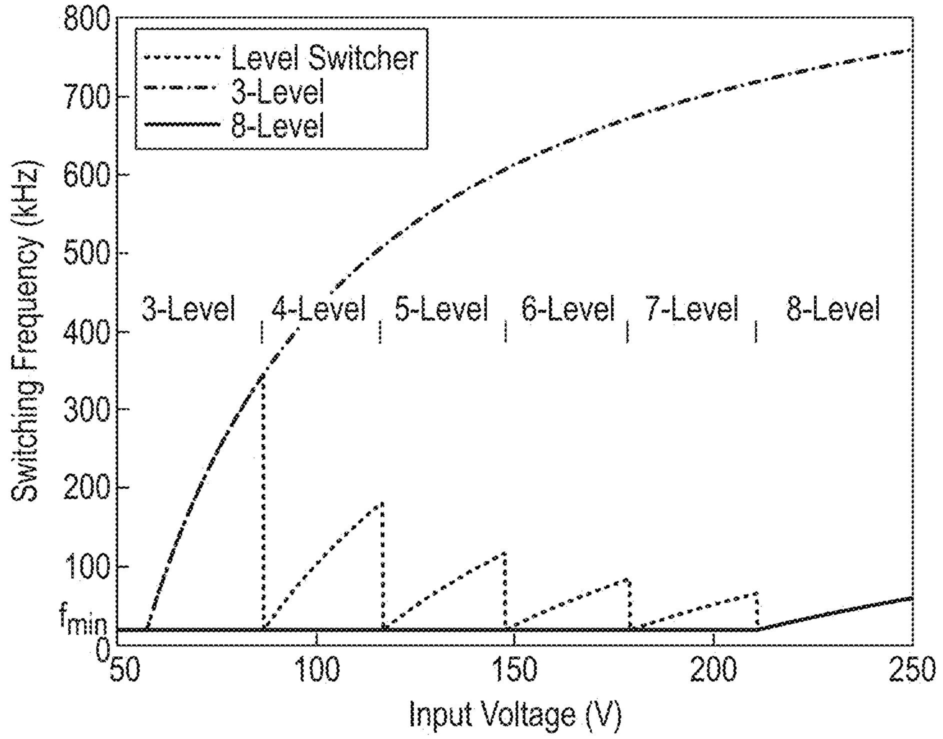
FIG. 7 shows a graph of switching frequency vs input voltage for a given output voltage for a three-level FCML buck converter, an eight-level FCML buck converter, and an eight-level FCML buck converter switching between operating as a three-level FCML buck converter and an eight-level FCML buck converter.

FIG. 7 presents a comparison of the variation in switching frequency between a standard three-level QSW/ZVS FCML Buck Converter 100, an eight-level TCM/QSW/ZVS FCML Buck Converter, and an eight-level QSW/ZVS FCML Buck Converter which switches the number of active levels according to the input voltage, i.e. operating in the level switcher mode. The level switcher mode of operation shown in FIG. 7 halves the switching frequency range when compared with the three-level QSW FCML Buck Converter. The level switcher mode of operation also ensures QSW/ZVS operation through the entire input voltage range, while ensuring that izvs does not need to be set at a large negative current. Whereas, QSW/ZVS cannot be achieved by the eight-level FCML Buck Converter unless it operates TCM with a large negative value of izvs.

FIG. **8*a* shows a five-level FCML buck converter 800 with all five levels in use. By turning on both Q4 811 and $\overline{Q_4}$ 811', a level of the five-level FCML buck converter 800** is effectively switched off. This results in the equivalent circuit

Figure 8A:
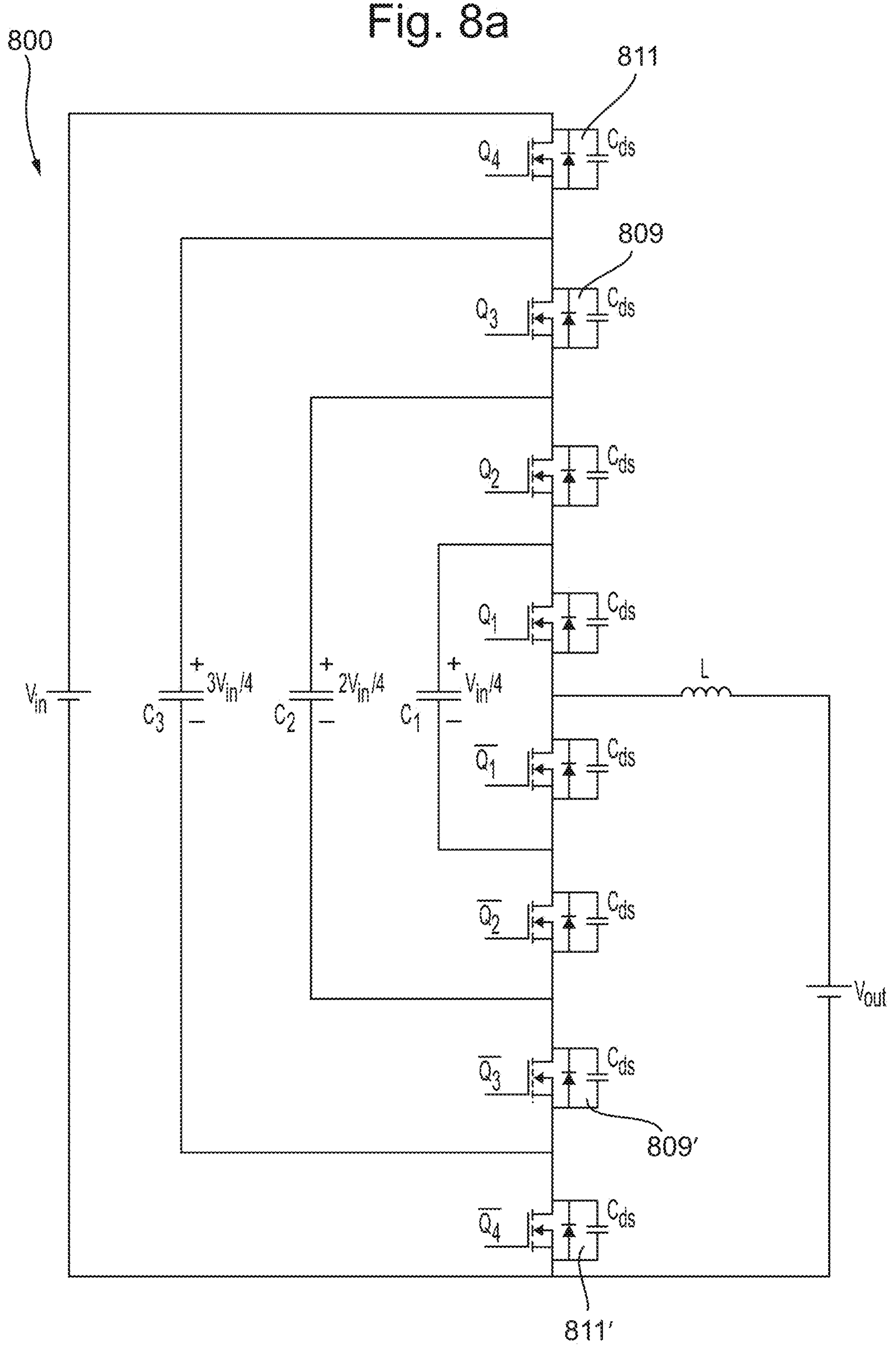
FIG. 8*a* shows a five-level FCML buck converter.
Figure 8B:
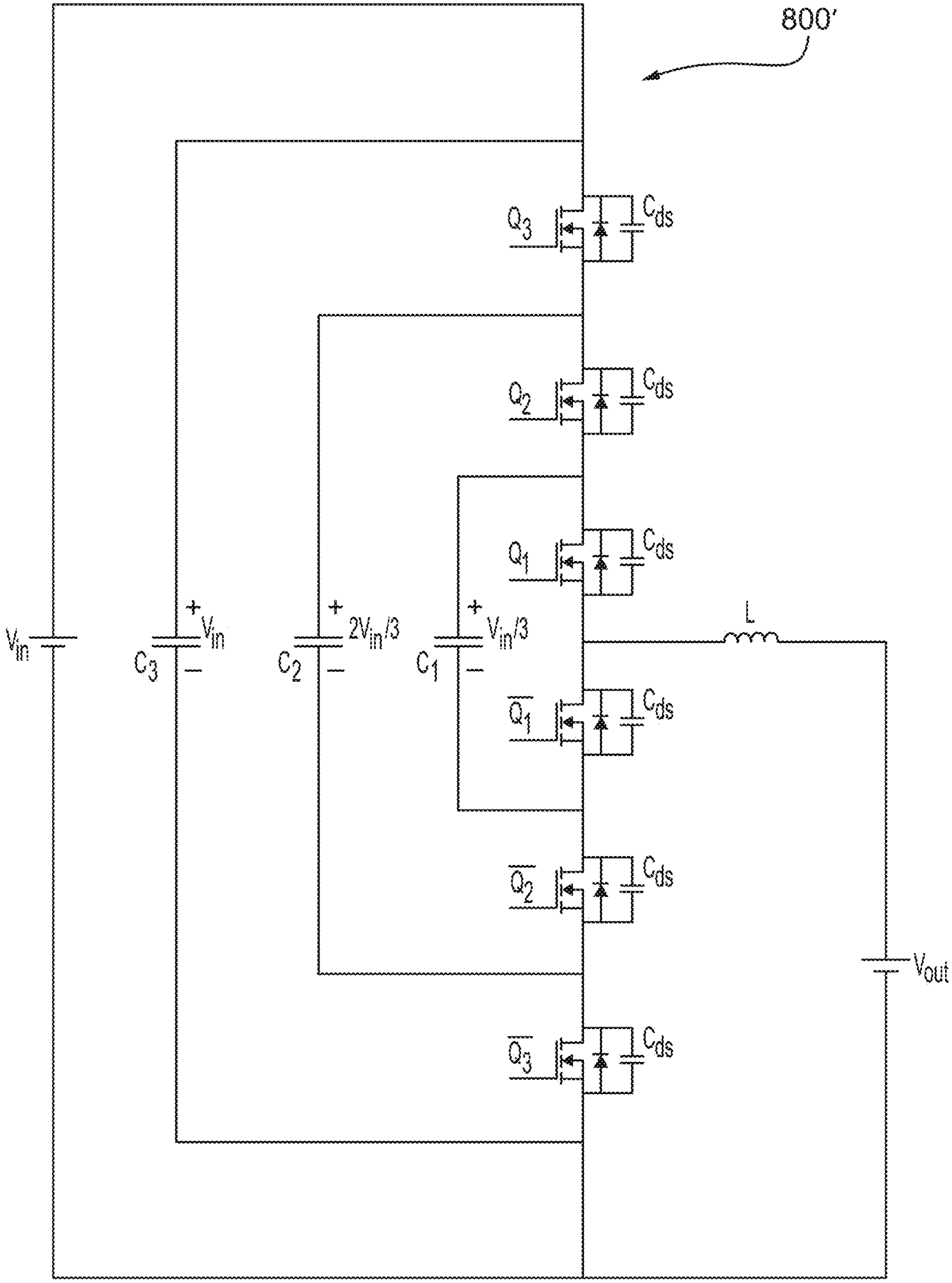
FIG. 8*b* shows the equivalent circuit for a five-level FCML buck converter operating as a four-level FCML buck converter.
Figure 8C:
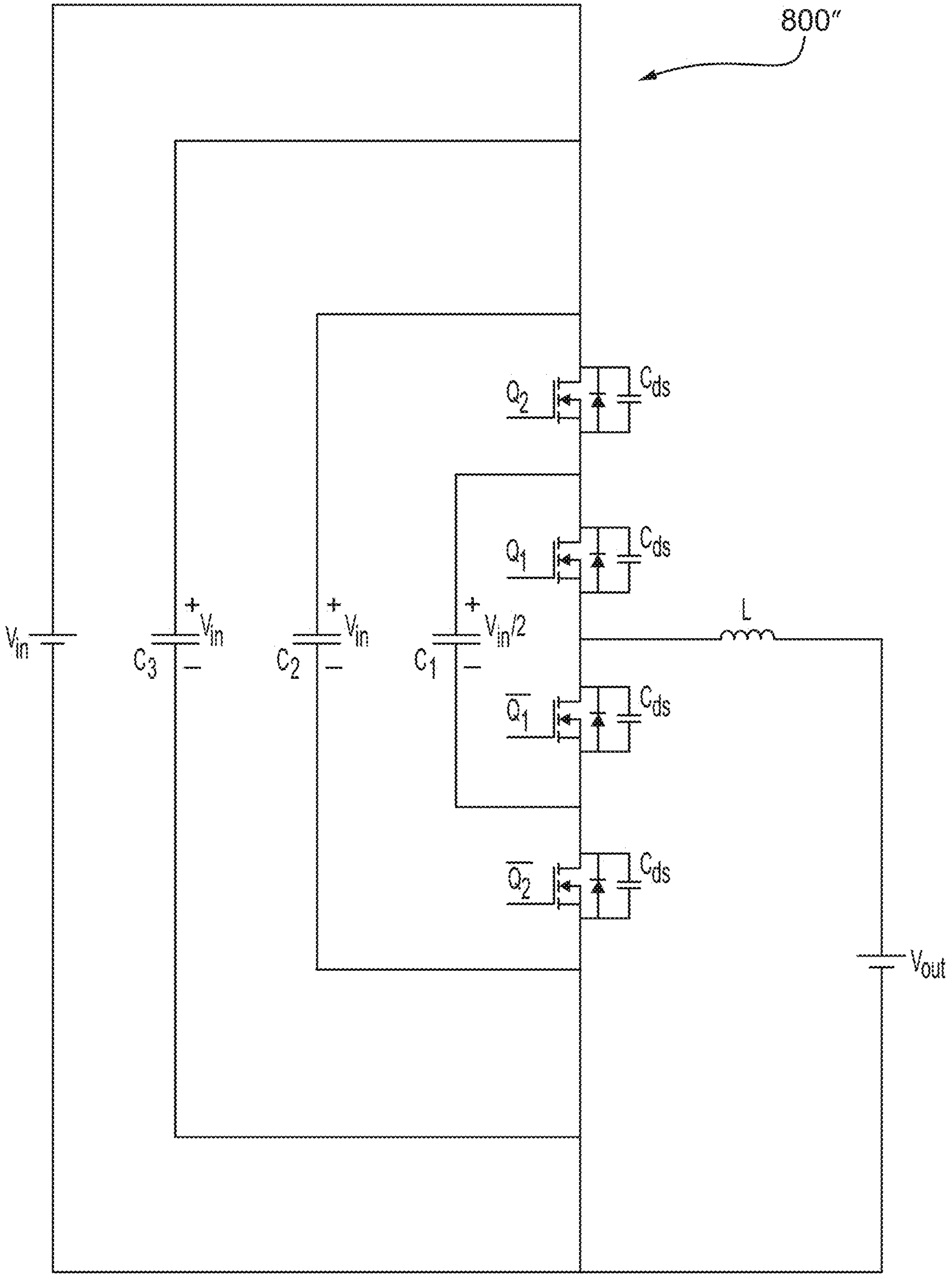
FIG. 8*c* shows the equivalent circuit for a five-level FCML buck converter operating as a three-level FCML buck converter.

800' shown in FIG. 8*b*, which is equivalent to a four-level FCML buck converter. Furthermore, by also turning on both Q3 809 and $\overline{Q_3}$ 809', another level of the FCML buck converter may be switched off. This results in the equivalent circuit 800" shown in FIG. 8*c*, which is equivalent to a three-level FCML buck converter.

Figure 9:
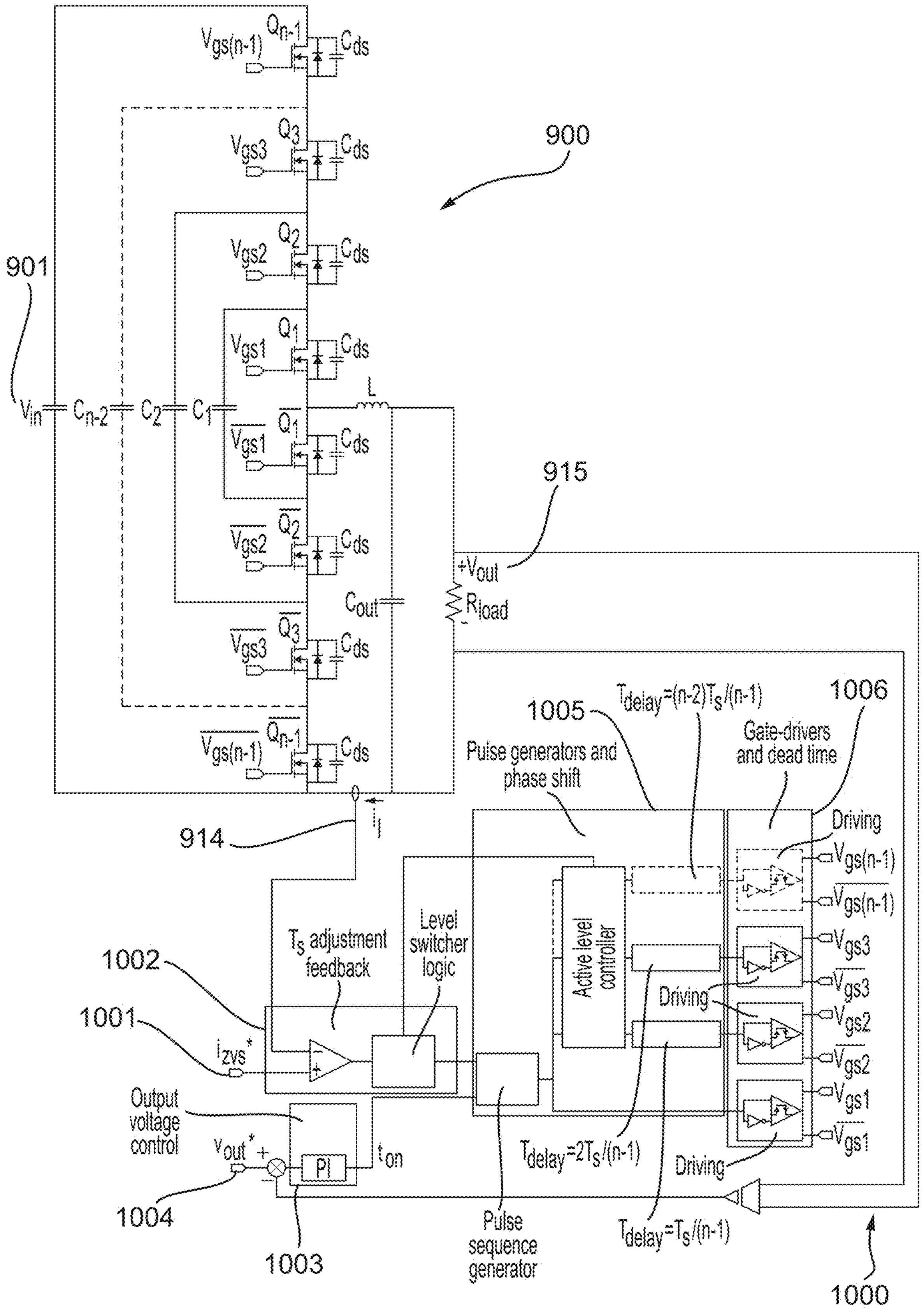
FIG. 9 shows a n-level FCML buck converter and a controller for the n-level FCML buck converter.

FIG. 9 shows an example of a controller 1000 for an n-level FCML buck converter 900 operating QSW/ZVS. The controller 1000 has a current feedback loop 1002, which adjusts the switching frequency of the switching elements based on the difference between the current through the inductor iL 914 and izvs* 1001, the zero voltage switching current value required for the converter to operate ZVS. In this example, the value of izvs* 1001 may be zero or below zero, i.e. the n-level FCML buck converter 900 may operate QSW/TCM to achieve ZVS. This current feedback loop 1002 effectively ensures that switching elements are triggered to turn off when iL 914 is equal to izvs* 1001 to ensure ZVS switch on operation.

The controller 1000 of FIG. 9 also has a voltage feedback loop 1002. This voltage feedback loop 1002 adjusts the duty cycle by adjusting the pulse width of the trigger signals for the switching elements, i.e. the duration that the switching elements are on for. The voltage feedback loop 1003 adjusts the pulse width based on the difference between the output voltage Vout 915 and the desired output voltage Vout* 1004.

Based on the inputs received from the current feedback loop 1002 and the voltage feedback loop 1003, the pulse generator 1005 generates a series of phase shifted pulses. The pulse generator 1005 may also adjust control of the n-level FCML buck converter 900 to vary the number of active levels depending on either the input voltage Vin 901, the output voltage Vout 915 or both the input voltage Vin 901 and the output voltage Vout 915. The choice of basis for varying the number of active levels of the n-level FCML buck converter 900 may be based on whether variation is expected of the input voltage Vin 901, the output voltage Vout 915 or both the input voltage Vin 901 and the output voltage Vout 915.

The phase shift of the pulses generated by the pulse generator 1005 depends on the number of active levels of the n-level FCML buck converter 900. The switching frequency depends on the QSW/ZVS operation of the n-level FCML buck converter 900, and the pulse width depends on the duty cycle. The phase shifted pulses are received as inputs to the gate drivers 1006 of the switching elements of the n-level FCML buck converter 900 to trigger each of the switching elements of the n-level FCML buck converter 900.

Figure 10A:
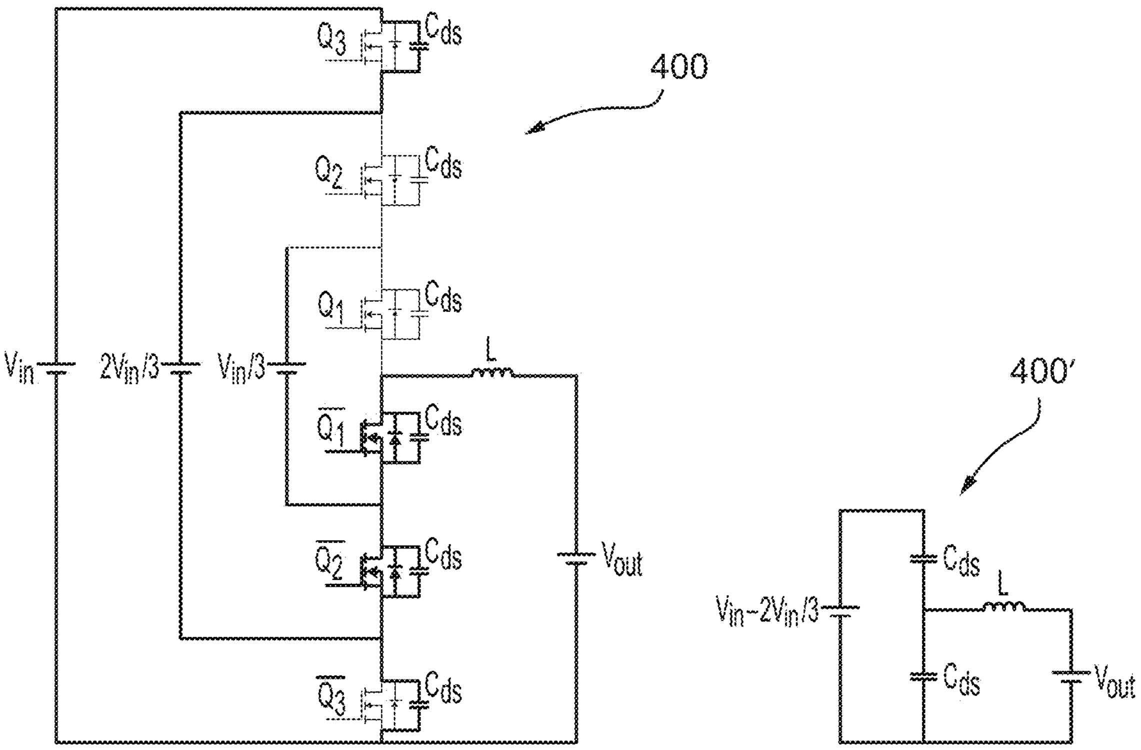
FIGS. 10*a*, 10*b* and 10*c* show the equivalent circuit states for QSW/ZVS switching for a four-level FCML buck converter.
Figure 10B:
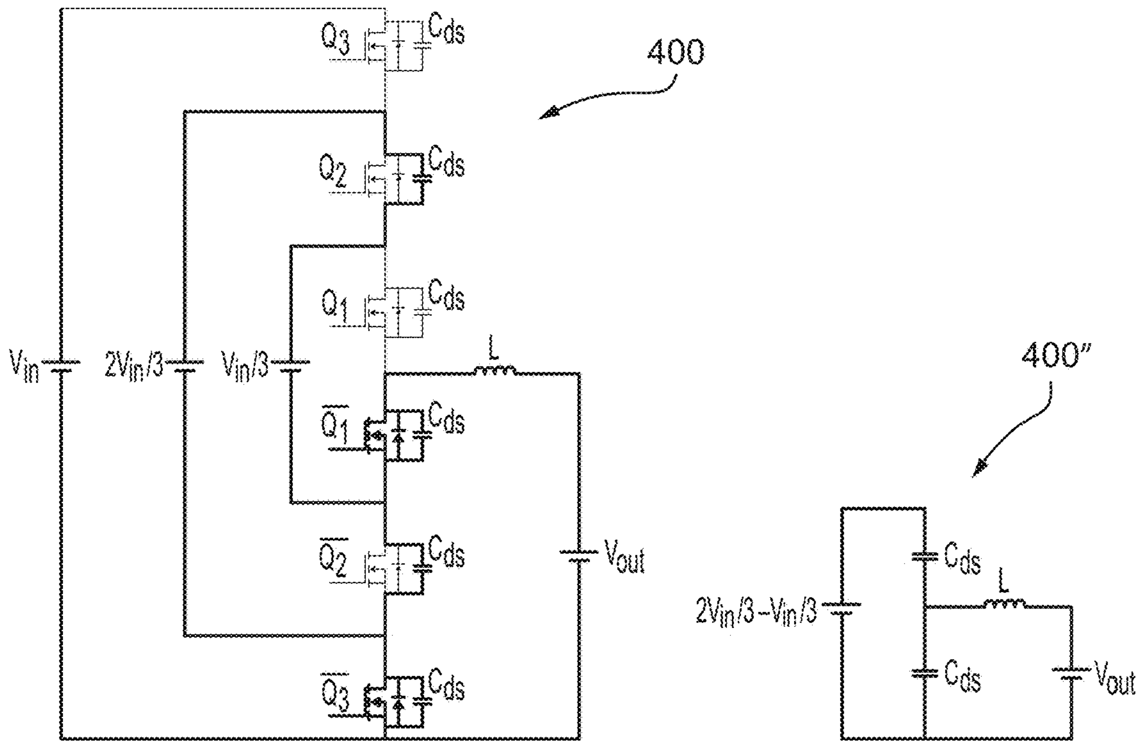
Figure 10C:
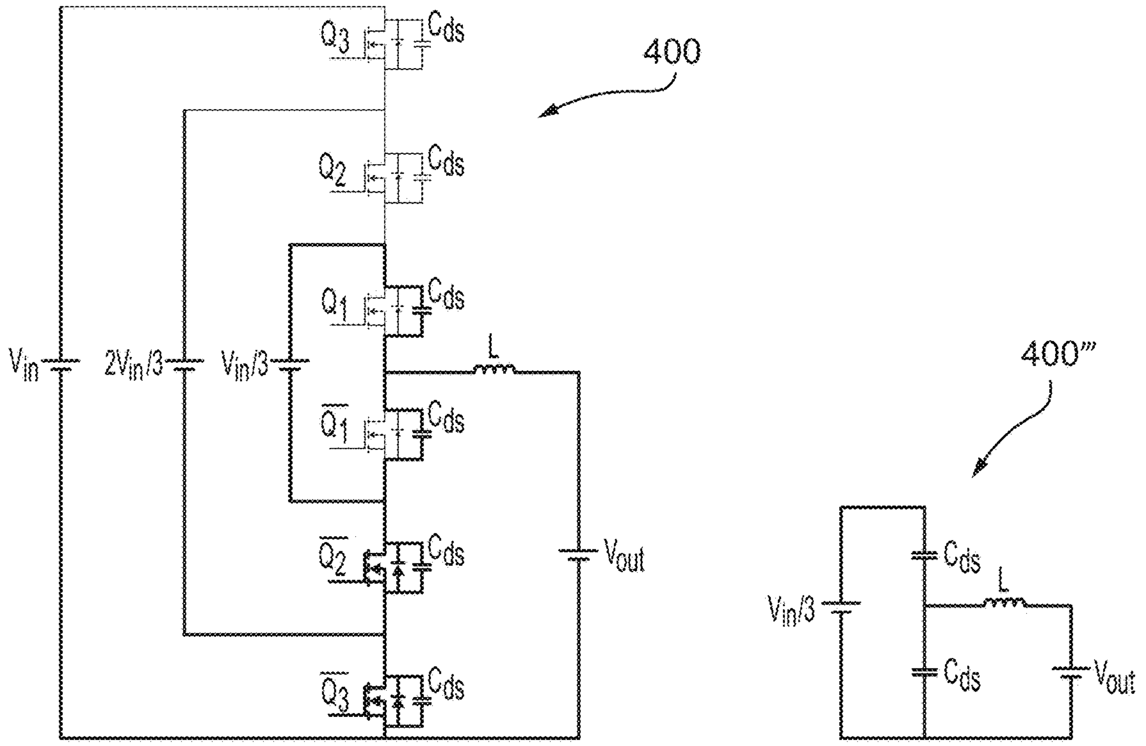

FIGS. 10*a*, 10*b* and 10*c* show the circuit states during QSW/ZVS switch on for the four-level FCML buck converter 400 of FIG. 4 for Q1 407, Q2 408 and Q3 409 respectively. In each figure, the non-bold components of the circuit 400 indicate that these circuit components are not conducting. The respective resulting equivalent circuits in each case are also shown in FIGS. 10*a*, 10*b* and 10*c*. The equivalent circuit 400' during Q3 409 switching on QSW/ZVS is shown in FIG. 10*a*. The equivalent circuit 400" during Q2 408 switching on QSW/ZVS is shown in FIG. 10*b*. The equivalent circuit 400'" during Q1 407 switching on QSW/ZVS is shown in FIG. 10*c*. FIGS. 10*a* to 10*c* show that for a 4-level FCML converter the transitions between each pair of switching elements, Q1 107 and $\overline{Q_1}$ 107', Q2 408 and $\overline{Q_2}$ 108', and Q3 409 and $\overline{Q_3}$ 409', may be achieved QSW/ZVS. For each transition, the same set of equations, described above, is applicable and therefore the same value of izvs may be chosen for each transition.

Figure 11:
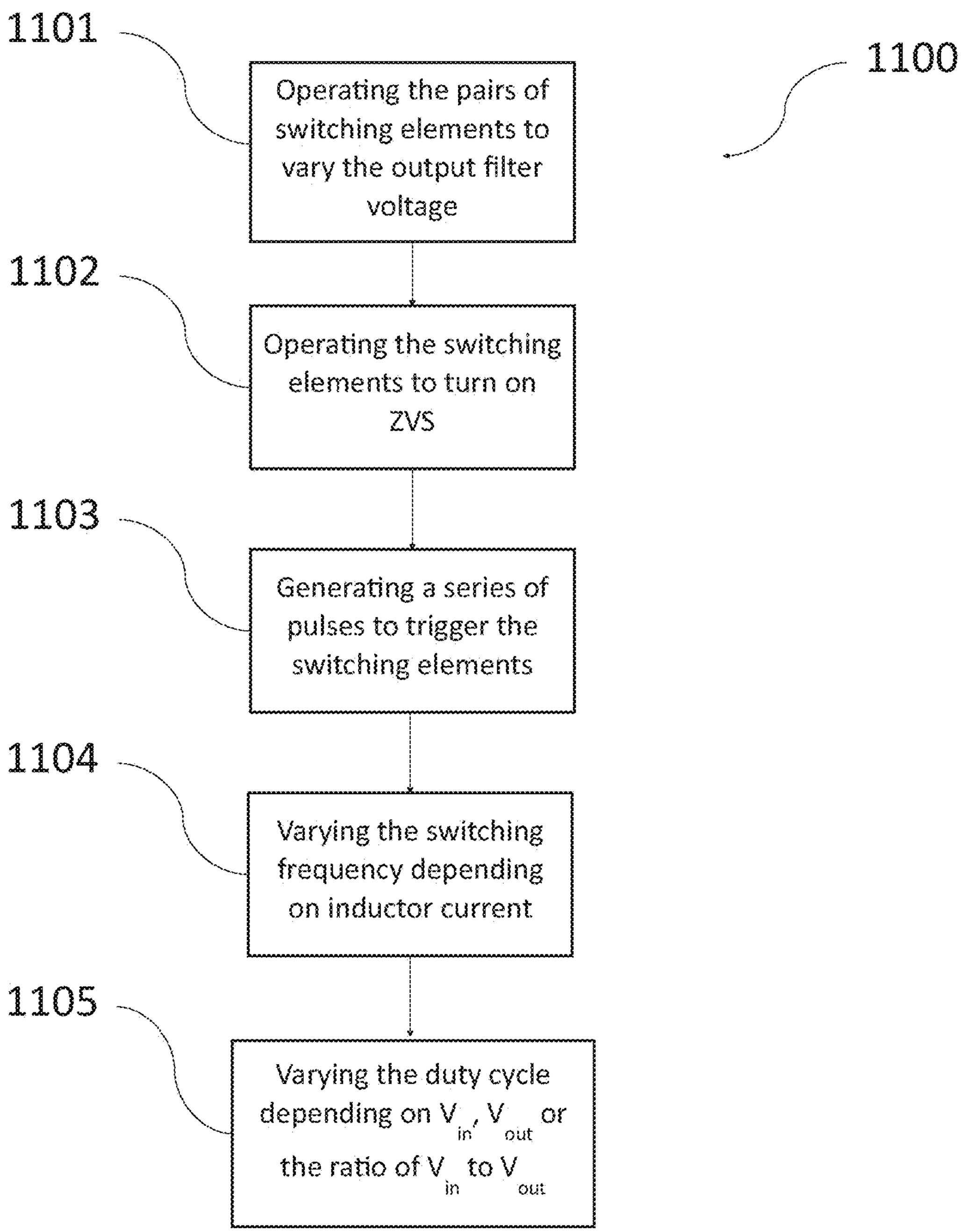
FIG. 11 shows a method of operation of an n-level FCML buck converter, such as the n-level FCML buck converters of FIGS. 5 and 9 operating ZVS.

FIG. 11 shows a method 1100 of operation of an n-level FCML buck converter, such as the n-level FCML buck converters 500, 900 of FIGS. 5 and 9 operating ZVS. The method is described below with reference to FIGS. 5 and 11.

The method comprises a first step 1101 of operating the pairs of switching elements, i.e. the first pair of switching elements Q1 and $\overline{Q_1}$ to the final pair of switching elements Qn−1 and $\overline{Q_{n-1}}$, in a sequence to selectively apply the voltage across the respective flying capacitor, i.e. C1 to Cn−2, or the input voltage Vin 501 to the output filter voltage 502.

The method 1100 further comprises a step 1102 of operating the pairs of switching elements such that each switching element turns on when the voltage across the switching element is zero, i.e. each switching element turns on ZVS.

This may be achieved by turning off a first switching element, e.g. Q1 to Qn−1, before turning on a second switching element, e.g. $\overline{Q_1}$ to $\overline{Q_{n-1}}$, when operating the respective pair of switching elements; and vice-versa when turning on the first switching element of each pair.

When turning on the second switching element from a pair of switching elements, turning off of the first switching element may occur when the current through the inductor 504 is a pre-determined value of izvs. This pre-determined value of izvs may be zero or less than zero. This may ensure that the second switching element can turn on ZVS. A corresponding process may be used to turn on the first switching element from a pair of switching elements ZVS, by turning off the second switching element when the current through the inductor 504 is a pre-determined value of izvs.

The pairs of switching elements may operate in phase (or synchronously), i.e. the first switching element from each pair of switching element may all turn on and off simultaneously; and the second switching element from each pair of switching element may all turn on and off simultaneously. This would result in the output filter voltage 502 alternating between zero and Vin 501.

However, the pairs of switching elements may also operate out of phase (or asynchronously) in order to vary the output filter voltage 502 between any one of n voltage levels.

The method 1100 may further comprise generating a series of pulses 1103 in order to trigger the switching elements of the n-level FCML buck converter 500. The phase shift of the pulses may correspond with the number of active levels of the n-level FCML buck converter 500. In some examples, the pulses may be equally spaced apart within one cycle of operation of the n-level FCML buck converter 500. The pulse width may correspond with the duty cycle of the n-level FCML buck converter 500.

The method may further comprise varying the switching frequency 1104 of the n-level FCML buck converter 500 depending on current through the inductor 504. Varying the switching frequency may comprise varying the frequency of the series of phase shifted pulses.

The method may further comprise varying the duty cycle 1105 of the FCML buck converter depending on at least one of the input voltage Vin 501, the output voltage Vout or the ratio of the input voltage Vin 501 to the output voltage Vout. Varying the duty cycle may comprise varying the pulse width of the series of phase shifted pulses.

Figure 12:
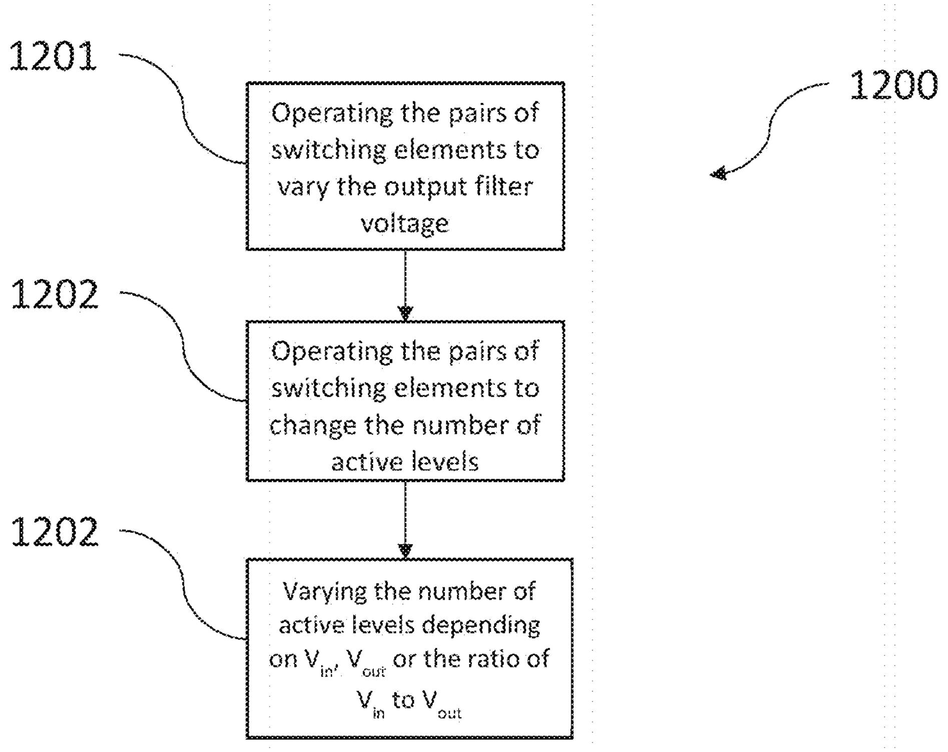
FIG. 12 shows a method of operation of an n-level FCML buck converter, such as the n-level FCML buck converters of FIGS. 5 and 9 operating in a level switcher mode of operation.

FIG. 12 shows a method 1200 of operation of an n-level FCML buck converter, such as the n-level FCML buck converters 500, 900 of FIGS. 5 and 9 operating in a level switcher mode of operation. The level switcher method 1200 is described below with reference to FIGS. 5 and 11. The level switcher method 1200 may be performed in combination with the ZVS method 1100, i.e. the n-level FCML buck converter may operate ZVS according to the method 1100 while also operating in the level switcher mode according to the method 1200. Hence, any or all of the method steps in the method 1100 of operating ZVS may be applied to the method 1200 of operating in a level switcher mode.

The method 1200 comprises a first step 1201 of operating the pairs of switching elements, i.e. the first pair of switching elements Q1 and $\overline{Q_1}$ to the final pair of switching elements Qn−1 and $\overline{Q_{n-1}}$, in a sequence to selectively apply the voltage across the respective flying capacitor, i.e. C1 to Cn−2, or the input voltage Vin 501 to the output filter voltage 502.

The method 1200 further comprises a second step 1202 of operating the pairs of switching elements to change the number of active levels of the n-level flying capacitor multi-level buck converter. The number of active levels may be reduced by turning on both of the switching elements of the final pair of switching elements Qn−1 and $\overline{Q_{n-1}}$. The number of active levels may be further reduced by turning on both of the switching elements of the penultimate pair of switching elements Qn−2 and $\overline{Q_{n-2}}$ and so on. This process of reducing the active number of levels of an n-level FCML buck converter has also been shown in FIGS. 8*a* to 8*c* and described in the corresponding description of these figures.

The method 1200 may further comprise varying the number of active levels 1203 based on at least one of the input voltage Vin 501, the output voltage Vout 515, or the ratio between the input voltage Vin 501 and the output voltage Vout 515.

By operating an n-level FCML buck converter in a level switcher mode of operation, a reduction in variation of the switching period may be achieved. Reducing variation of the switching period may be particularly important in applications where the input voltage is likely to vary significantly. Such applications include aircrafts where DC power distribution is used. Here, the high voltages may be used in the aircraft's propulsion systems, while the lower voltages may be used elsewhere in the aircraft. In these applications, the high input voltage may have a wide variation, such as a variation between 400v to 750V. In some applications, the high voltage DC bus used in aircraft applications may even reach in excess of 3 kV. Therefore, the reduction on switching frequency range may lead to better EMI management and optimized EMI filter size.

Other important considerations in aerospace applications include volume and weight reduction. This is typically achieved in power converters by increasing frequency operation, which leads to size reduction of the passive elements (i.e., capacitors, inductors, etc.) which are key contributors to the overall volume and weight in power converters. However, it comes at the cost of higher switching losses and increased thermal dissipation. Consequently, both the semiconductor's temperature and the cooling system's size will increase, which are also limiting factors to be added to the passive elements volume and weight reduction. Hence, the importance of ZVS switching to reduce the switching losses, primarily as heat, is apparent in aerospace applications. This may enable the use of smaller and/or lighter cooling systems. Furthermore, ZVS switching operation may enable the converter to be smaller and/or lighter overall, e.g. by reducing the size of the cooling system or by enabling more freedom in design choices, such as selection of switches.

By removing part of the semiconductor's switching losses, the technique enables the power converter's switching frequency to increase, and the overall weight and volume of the system are reduced. Differently from other options to achieve ZVS, which rely on resonant converters or auxiliary circuits, the QSW can be applied to traditional DC-DC converters without the requirement of any extra circuits or complex control techniques. The simple design and implementation of the n-level QSW FCML buck converter 500 is able to be deployed with both analogue and digital control. Moreover, operating QSW necessarily requires larger current ripple at the power inductor which, apart from the switching frequency variable, can also lead to further reductions in the magnetics weight and volume.

Hence, the high voltage advantages of a multi-level converter as the FCML are combined to the high-frequency, low-losses, QSW and TCM operating modes to enable soft-switching of the switching elements. Therefore, the n-level FCML buck converter 500 may result in high-voltage, high-frequency, low-losses and reduced size converter, which is particularly interesting for electrified aircrafts with high voltage DC distribution.

If compared to a traditional two-level buck converter, the n-level FCML buck converter 500 at the same switching frequency has much smaller passive components and voltage stress over the semiconductors, e.g. the voltage across each switching element is significantly lower. This already sets a clear advantage in power density and specific power over a two-level buck converter despite the increased number of active components. For example, this may result in a significant reduction on breakdown voltage for devices, enabling the use of automotive graded GaN or Si devices for HV applications. By applying a QSW ZVS technique to the converter, its switching frequency can be pushed higher resulting in even greater achievements in power density and specific power. Such an outcome can be very beneficial in an aerospace market moving towards more electrified aircrafts, where more and more DC/DC interfaces to energy storage systems are required.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An n-level flying capacitor multi-level buck converter, for converting a DC input voltage into a DC output voltage provided at a load, comprising:

an output filter comprising:

an output capacitor;

an inductor arranged in series with the output capacitor and configured to be arranged in series with the load; and wherein the output capacitor arranged in series with the inductor and configured to be arranged in parallel with the load;

a first pair of switching elements arranged in series with the DC input voltage; and a second pair of switching elements arranged in series with the DC input voltage;

wherein each of the first and second pairs of switching elements comprises a first switching element and a second switching element;

wherein the first switching element and the second switching element of the first pair of switching elements are arranged adjacent each other;

wherein the first switching element of the second pair of switching elements is arranged adjacent to the first switching element of the first pair of switching elements;

wherein the second switching element of the second pair of switching elements is arranged adjacent to the second switching element of the first pair of switching elements;

wherein the output filter is arranged in series with the first switching elements of the first and second pairs of switching elements, and in parallel with the second switching elements of the first and second pairs of switching elements;

wherein the n-level flying capacitor multi-level buck converter further comprises a first flying capacitor in parallel with the first pair of switching elements; and wherein the n-level flying capacitor multi-level buck converter is configured to:

operate the first and second pairs of switching elements in a sequence to selectively apply a portion of the input voltage across the output filter; and operate the first and second pairs of switching elements such that each switching element is switched on when a voltage across the switching element is zero;

operate the pairs of switching elements to change a number of active levels of the n-level flying capacitor multi-level buck converter; and to reduce the number of active levels by switching on both the first switching element and the second switching element of the pair of switching elements arranged proximate to the DC input voltage.

2. The n-level flying capacitor multi-level buck converter as claimed in claim 1, wherein:

the n-level flying capacitor multi-level buck converter further comprises a third pair of switching elements;

the third pair of switching elements is arranged in series with the DC input voltage;

the third pair of switching elements comprises a first switching element and a second switching element;

the first switching element of the third pair of switching elements is arranged adjacent to the first switching element of the second pair of switching elements;

the second switching element of the third pair of switching elements is arranged adjacent to the second switching element of the second pair of switching elements;

the output filter is arranged in series with the first switching element of the third pair of switching elements, and in parallel with the second switching element of the third pair of switching elements; and wherein the n-level flying capacitor multi-level buck converter further comprises a second flying capacitor in parallel with the second pair of switching elements; and wherein the n-level flying capacitor multi-level buck converter is configured to:

operate the third pair of switching elements in a sequence to selectively apply the portion of the input voltage across the output filter; and operate the third pairs of switching elements such that each switching element is switched on when a voltage across the switching element is zero.

3. The n-level flying capacitor multi-level buck converter as claimed in claim 1, wherein the first switching element of each pair of switching elements is arranged to be switched off before the second switching element of each pair of switching elements is switched on; and wherein the second switching element of each pair of switching elements is arranged to be switched off before the first switching element of each pair of switching elements is switched on.

4. The n-level flying capacitor multi-level buck converter as claimed in claim 1, wherein the n-level flying capacitor multi-level buck converter is arranged such that the current through the inductor is zero when the second switching element of each pair of switching elements is switched off.

5. The n-level flying capacitor multi-level buck converter as claimed in claim 1, wherein the n-level flying capacitor multi-level buck converter is arranged such that a current through the inductor is less than zero when the second switching element of each pair of switching elements is switched off.

6. The n-level flying capacitor multi-level buck converter as claimed in claim 1, wherein the n-level flying capacitor multi-level buck converter is arranged such that a current through the inductor is a predetermined value when the second switching element of each pair of switching elements is switched off.

7. The n-level flying capacitor multi-level buck converter as claim 1, wherein:

the pairs of switching elements are arranged to be triggered by a series of phase shifted pulses;

a phase shift of the phase shifted pulses corresponds to a number of active levels of the n- level flying capacitor multi-level buck converter; and a pulse width of the phase shifted pulses corresponds to a duty cycle of the n-level flying capacitor multi-level buck converter.

8. The n-level flying capacitor multi-level buck converter as claimed in claim 1, wherein:

the n-level flying capacitor multi-level buck converter further comprises a third pair of switching elements;

the third pair of switching elements are arranged in series with the DC input voltage;

the third pair of switching elements comprises a first switching element and a second switching element;

the first switching element of the third pair of switching elements is arranged adjacent to the first switching element of the second pair of switching elements;

the second switching element of the third pair of switching elements is arranged adjacent to the second switching element of the second pair of switching elements;

the output filter is arranged in series with the first switching element of the third pair of switching elements, and in parallel with the second switching element of the third pair of switching elements; and the n-level flying capacitor multi-level buck converter further comprises a flying capacitor in parallel with the second pair of switching elements; and the n-level flying capacitor multi-level buck converter is configured to further reduce the number of active levels by switching on both the first switching element and the second switching element of the pair of switching elements adjacent to the pair of switching elements which are arranged proximate to the DC input voltage.

9. The n-level flying capacitor multi-level buck converter as claimed in claim 1, wherein the n-level flying capacitor multi-level buck converter is configured to change the number of active levels depending on the input voltage, the output voltage or the ratio between the input voltage and the output voltage.

10. An n-level flying capacitor multi-level buck converter, for converting a DC input voltage into a DC output voltage provided at a load, comprising:

an output filter comprising:

an output capacitor;

an inductor arranged in series with the output capacitor and configured to be arranged in series with the load; and wherein the output capacitor arranged in series with the inductor and configured to be arranged in parallel with the load;

a first pair of switching elements arranged in series with the DC input voltage; and a second pair of switching elements arranged in series with the DC input voltage;

wherein each of the first and second pairs of switching elements comprises a first switching element and a second switching element;

wherein the first switching element and the second switching element of the first pair of switching elements are arranged adjacent each other;

wherein the first switching element of the second pair of switching elements is arranged adjacent to the first switching element of the first pair of switching elements;

wherein the second switching element of the second pair of switching elements is arranged adjacent to the second switching element of the first pair of switching elements;

wherein the output filter is arranged in series with the first switching elements of the first and second pairs of switching elements, and in parallel with the second switching elements of the first and second pairs of switching elements;

wherein the n-level flying capacitor multi-level buck converter further comprises a first flying capacitor in parallel with the first pair of switching elements; and wherein the n-level flying capacitor multi-level buck converter is configured to:

operate the first and second pairs of switching elements in a sequence to selectively apply a portion of the input voltage across the output filter; and operate the first and second pairs of switching elements such that each switching element is switched on when a voltage across the switching element is zero;

wherein the n-level flying capacitor multi-level buck converter further comprises a controller arranged to generate a or the series of phase shifted pulses to trigger the pairs of switching elements of the n-level flying capacitor multi-level buck converter: wherein a or the phase shift of the phase shifted pulses corresponds to a or the number of active levels of the n-level flying capacitor multi-level buck converter; and wherein a or the pulse width of the phase shifted pulses corresponds to a or the duty cycle of the n-level flying capacitor multi-level buck converter;

wherein the controller further comprises a current feedback loop which adjusts a switching frequency of the switching elements based on a current through the inductor.

11. The n-level flying capacitor multi-level buck converter as claimed in claim 10, wherein the controller further comprises a voltage feedback loop which adjusts the duty cycle based on the at least one of the input voltage, the output voltage or the ratio between the input voltage and the output voltage.

12. A method of operating an n-level flying capacitor multi-level buck converter, for converting a DC input voltage into a DC output voltage provided at a load, wherein the n-level flying capacitor multi-level buck converter comprises:

an output filter comprising:

an inductor arranged in series with an output capacitor and for arranging in series with the load; and the output capacitor arranged in series with the inductor and for arranging in parallel with the load;

wherein the n-level flying capacitor multi-level buck converter comprises:

a first pair of switching elements arranged in series with the DC input voltage; and a second pair of switching elements arranged in series with the DC input voltage;

wherein each of the first and second pairs of switching elements comprises a first switching element and a second switching element;

wherein the first switching element and the second switching element of the first pair of switching elements are arranged adjacent;

wherein the first switching element of the second pair of switching elements is arranged adjacent to the first switching element of the first pair of switching elements;

wherein the second switching element of the second pair of switching elements is arranged adjacent to the second switching element of the first pair of switching elements; and wherein the output filter is arranged in series with the first switching elements of the first and second pairs of switching elements, and in parallel with the second switching elements of the first and second pairs of switching elements;

wherein the n-level flying capacitor multi-level buck converter further comprises a flying capacitor in parallel with the first pair of switching elements;

wherein the method comprises:

operating the first and second pairs of switching elements in a sequence to selectively apply a portion of the input voltage across the output filter; and operating the first and second pairs of switching elements such that each switching element is switched on when a voltage across the switching element is zero;

operating the pairs of switching elements to change a number of active levels of the n-level flying capacitor multi-level buck converter; and reducing the number of active levels by switching on both the first switching element and the second switching element of the pair of switching elements arranged proximate to the DC input voltage.

13. The method of claim 12 further comprising:

changing the number of active levels depending on the input voltage, the output voltage or the ratio between the input voltage and the output voltage.

14. The method of claim 12, further comprising:

providing a controller arranged to generate a series of phase shifted pulses to trigger the pairs of switching elements of the n-level flying capacitor multi-level buck converter: wherein a or the phase shift of the phase shifted pulses corresponds to a number of active levels of the n-level flying capacitor multi-level buck converter; and wherein a pulse width of the phase shifted pulses corresponds to a or the duty cycle of the n-level flying capacitor multi-level buck converter.

15. The method of claim 14, wherein the controller further includes a current feedback loop which adjusts a switching frequency of the switching elements based on a current through the inductor.

16. The method of claim 14, wherein the controller further comprises a voltage feedback loop which adjusts the duty cycle based on the at least one of the input voltage, the output voltage or the ratio between the input voltage and the output voltage.

* * * * *